(12) United States Patent
Yang et al.

(10) Patent No.: US 11,649,803 B2
(45) Date of Patent: May 16, 2023

(54) METHOD OF IDENTIFICATION AND COMPENSATION OF INHERENT DEVIATION OF YAW ERROR OF WIND TURBINE BASED ON TRUE POWER CURVE

(71) Applicant: ZHEJIANG UNIVERSITY, Hangzhou (CN)

(72) Inventors: Qinmin Yang, Hangzhou (CN); Yunong Bao, Hangzhou (CN); Jiming Chen, Hangzhou (CN); Youxian Sun, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 90 days.

(21) Appl. No.: 17/319,120

(22) Filed: May 13, 2021

(65) Prior Publication Data
US 2021/0262439 A1    Aug. 26, 2021

Related U.S. Application Data

(63) Continuation of application No. PCT/CN2018/116072, filed on Nov. 18, 2018.

(51) Int. Cl.
F03D 7/02 (2006.01)
F03D 17/00 (2016.01)
F03D 7/04 (2006.01)

(52) U.S. Cl.
CPC .......... *F03D 7/0204* (2013.01); *F03D 7/04* (2013.01); *F03D 17/00* (2016.05); *F05B 2270/32* (2013.01); *F05B 2270/329* (2013.01)

(58) Field of Classification Search
None
See application file for complete search history.

(56) References Cited

U.S. PATENT DOCUMENTS 8,269,361 B2 *  9/2012  Egedal ............... F03D 13/10
                                                          290/44
8,890,349 B1   11/2014  Lynch et al.
(Continued)

FOREIGN PATENT DOCUMENTS

CN        102213182 A      10/2011
CN        105909466 A       8/2016
                    (Continued)

OTHER PUBLICATIONS

Hayashi et al (JP 2008291786 A) (Year: 2008).*
(Continued)

*Primary Examiner* — Juan G Flores
(74) *Attorney, Agent, or Firm* — W&G Law Group

(57) ABSTRACT

Provided is a method of identification and compensation of an inherent deviation of a yaw error of a wind turbine based on a true power curve. The method, based on a wind turbine data acquisition and monitoring control (SCADA) system includes a wind speed, an active power, and a yaw error and so on, runs data in real-time, first pre-processes the data to a certain degree, and then divides a power curve data according to a certain yaw error interval, fits the power curves according to different yaw error intervals through a true power curve fitting flow in connection with an outlier discrimination method, further quantitatively analyzes the different power curves and determines an interval scope of the yaw error inherent deviation value based on an interval determination criterion, and finally compensates the identified inherent deviation value to a yaw error measurement value.

6 Claims, 9 Drawing Sheets

(56) References Cited

U.S. PATENT DOCUMENTS 11,286,910 B2 * 3/2022 Slanitsch ................. G01P 5/02
2020/0088171 A1 * 3/2020 Göldner .................... G01P 5/02

FOREIGN PATENT DOCUMENTS

| CN | 106014878 A | 10/2016 |
| --- | --- | --- |
| CN | 106150904 A | 11/2016 |
| CN | 107944175 A | 4/2018 |

OTHER PUBLICATIONS

Gao et al (CN 106286130 A) (Year: 2017).*
International Search Report (PCT/CN2018/116072); dated Jul. 4, 2019.

* cited by examiner

METHOD OF IDENTIFICATION AND COMPENSATION OF INHERENT DEVIATION OF YAW ERROR OF WIND TURBINE BASED ON TRUE POWER CURVE

TECHNICAL FIELD

The present disclosure relates to a method of identification and compensation of an inherent deviation of a yaw error of a wind turbine, and more particularly, to a method of identification and compensation of an inherent deviation of a yaw error of a wind turbine based on a true power curve.

BACKGROUND

In modern society where traditional fossil energy resources are scarce and pollution is serious, wind energy, as a non-polluting and new renewable energy source, is widely favored by the public, and wind power industries have thus become one of new renewable energy industries that are developing worldwide. In China, construction of wind farms and related research work in the past decade have significant improvements in both quantity and quality. But while vigorously developing the wind power industry, it is also accompanied by a series of negative factors caused by a continuous degradation of a wind turbine itself. Nowadays, during the operation of wind turbines, since a wind speed has characteristics of intermittence and highly uncertainty, it has a relatively great impact on evaluation of a performance of the wind turbine itself, while an accurate evaluation of the performance of the wind turbine and an active exploration of performance improvement methods of the wind turbine are important to improve competitiveness of wind power in the new energy power generation.

At present, when coping with a change of a wind direction, the wind power generation system obtains a maximum wind energy capture efficiency by adjusting of a yaw system. FIG. 2 illustrates a schematic diagram of a wind turbine yaw control strategy, in which a specific control strategy of the yaw system and a controller is to ensure that a value of a yaw error is as small as possible, that is, to control a blade sweep surface of the wind turbine to directly face a direction of the incoming wind as much as possible if embodied in an actual physical meaning, that is, to control an angle of the yaw error θ to be as close as possible to 0°. In today's wind power industry related applications, determination of the yaw error angle by the wind turbine is implemented by direct measurement, i.e., by installing an anemometer behind a nacelle and calibrating a position of a zero position of the anemometer to be parallel to a direction of the nacelle; during normal operation conditions of the wind turbine, a sensor feeds back a measured wind direction value to the yaw system, and then the yaw system controls, based on its own yaw control strategy, the nacelle to be adjusted to the direction of the incoming wind. However, there are two major problems in actual installation, operation and maintenance of the anemometer:

(1) installers often do not rely on a measuring equipment, but calibrate the position of the zero position of the anemometer only by experience or visual inspection;

(2) a return error may still occur due to mechanical reasons during repeatedly rotation of the anemometer under actual operations. A gradual accumulation of these two aspects will often bring a relatively large error to measurement of the yaw error angle, thus affecting the performance of the yaw system.

Therefore, in a context that relevant research on intelligent identification and compensation technology based on data analysis in the field of performance improvement of the wind turbine is still in technical gap, based on research ideas of controller improvement, it is very meaningful to, aiming at the problem of determining the zero position error of the wind turbine nacelle anemometer, identify the yaw error inherent deviation value and then feedback and compensate to the yaw system, so as to achieve a purpose of improving an output performance of the wind power generation system.

SUMMARY

The present disclosure aims at filling in the technical gap of a data analysis-based intelligent identification and compensation technology in the field of performance improvement of wind turbines and provides a method of identification and compensation of an inherent deviation of a yaw error of a wind turbine based on a true power curve. The method, based on the data analysis, fits true power curves of the wind turbine within different yaw error intervals and designs corresponding indexes to quantify the performance under a premise of considering power curve outlier detection, and finally achieves, by combining a simple and effective yaw error inherent deviation identification criterion and a yaw error inherent deviation compensation strategy, the identification and compensation of the yaw error inherent deviation, which has a high practical application value for the power generation output performance improvement of wind turbines.

The object of the present disclosure is achieved by a following technical solution: a method of identification and compensation of an inherent deviation of a yaw error of a wind turbine based on a true power curve, the method includes following steps:

1) reading, based on identification and compensation requirements of the inherent deviation of the yaw error of the wind turbine to be analyzed, a total of N pieces of operation data information of the wind turbine obtained by measurement in a SCADA system of the wind turbine to be analyzed in a corresponding requirement cycle, the information including a wind speed $\{v_i\}$, an active power $\{P_i\}$ and the yaw error $\{\theta_i\}$, an information data set being denoted as a wind turbine yaw error inherent deviation analysis data set $\{X_i\}$, where i=1, 2, 3, . . . , N;

2) dividing the wind turbine yaw error inherent deviation analysis data set $\{X_i\}$ in the step 1) into M intervals at a yaw error interval, a number of pieces of data in a $k^{th}$ yaw error interval being denoted as $N_k$, the yaw error inherent deviation analysis data set being $\{\gamma\varepsilon_\iota^k\}=\{(v_\iota, p_\iota)\}$, where k=1, 2, 3, . . . , M, and ι=1, 2, 3, . . . , $N_k$;

3) respectively fitting out M true power curves based on the yaw error inherent deviation analysis data set $\{\gamma\varepsilon_\iota^k\}$ within the M intervals in the step 2), the true power curve within the $k^{th}$ yaw error interval being denoted as $\{PC_k\}$, where k=1, 2, 3, . . . , M;

4) calculating respective quantitative performance indexes $PI_k$ of the true power curves $\{PC_k\}$ within the M yaw error intervals in the step 3), where k=1, 2, 3, . . . , M;

5) determining an identification result of a yaw error inherent deviation value $\theta_{im}$ of the wind turbine through a yaw error inherent deviation identification criterion, and directly compensating an actual measured value θ of the yaw error with the deviation value $\theta_{im}$ directly in a form of an increment, so as to obtain the final compensated true yaw error θ', where $\theta'=\theta+\theta_{im}$;

the yaw error inherent deviation identification criterion is defined by: sorting the quantitative performance indexes $PI_k$ of true power curves $\{PC_k\}$ within all M yaw error intervals in the step 4) in descending order, and determining the interval subscript k' corresponding to a maximum quantitative performance index $PI_{max}$; and a calculation formula of the identification result of the yaw error inherent deviation value $\theta_{im}$ is as follows:

$$\theta_{im} = \theta_{lb} + \frac{2k'-1}{2M}(\theta_{ub} - \theta_{lb})$$

where $\theta_{lb}$ and $B_{ub}$ are a lower bound and an upper bound of the yaw error interval to be analyzed, respectively.

As a further description, in the step 2) of the method, said dividing the yaw error inherent deviation analysis data set $\{X_i\}$ into intervals includes:

2-a) plotting a frequency distribution histogram of the yaw error $\{\theta_i\}$, and setting, based on the distribution of the frequency distribution histogram, the lower bound $\theta^1{}_{lb}$ and the upper bound $\theta_{ub}$ of the yaw error interval to be analyzed;

2-b) setting a number M of intervals into which the yaw error inherent deviation analysis data set $\{X_i\}$ is divided;

2-c) dividing, with $$\frac{1}{M}(\theta_{ub} - \theta_{lb})$$

as a yaw error division interval, the yaw error inherent deviation analysis data set $\{X_i\}$, and retaining only wind speed and power information as the yaw error inherent deviation analysis data set $\{\gamma\varepsilon_1^k\}$.

As a further description, in the step 3) of the method, a flow for obtaining true power curves of the wind turbine within M yaw error intervals includes:

3-a) setting a true power curve obtaining initial interval k=1;

3-b) normalizing wind speed information and power information in the yaw error inherent deviation analysis data set $\{\gamma\varepsilon_1^k\}$ within the $k^{th}$ yaw error interval by maximum-minimum normalization, the normalized yaw error inherent deviation analysis data set being denoted as $\{\gamma\varepsilon_{norm,\iota}^k\}$, where $\iota=1, 2, 3, \ldots, N_k$;

3-c) dividing, respectively according to a wind speed interval (ws) and a power interval (ap), the normalized yaw error inherent deviation analysis data set $\{\gamma\varepsilon_{norm,\iota}^k\}$ in the step 3-b) into M' intervals, a number of pieces of data within a $j^{th}$ interval being denoted as $M_{k,seg,j}'$, the normalized yaw error inherent deviation analysis data set within the $j^{th}$ interval being denoted as $\{\gamma\varepsilon_{norm,n}^{k,seg,j}\}$, where seg={ws, ap}, j=1, 2, 3, ..., M', n=1, 2, 3, ..., $M_{k,seg,j}'$;

3-d) carrying out, by using an average distance discrimination (AVDC) outlier detection algorithm, suspected outlier detection within 2 M'intervals $\{\gamma\varepsilon_{norm,n}^{k,seg,j}\}$ in the step 3-c), a number of suspected outliers within the $j^{th}$ interval being denoted as $m_{AVDC}^{k,seg,j}$, a suspected outlier set in the normalized yaw error inherent deviation analysis data set being denoted as $\{Outlier_{sus,AVDC}^{k,seg,j}\}$, where seg={ws, ap}, j=1, 2, 3, ..., M', n=1, 2, 3, ..., $M_{k,seg,j}'$;

the average distance discrimination (AVDC) outlier detection algorithm lies in: for an interval in which the number $M_{k,seg,j}'$ of pieces of data is smaller than a given minimum threshold $\delta_{M'}$, determining that the suspected outlier set $\{Outlier_{sus,AVDC}^{k,seg,j}\}$ in the normalized yaw error inherent deviation analysis data set within the interval is Ø; otherwise, for a $j^{th}$ wind speed interval or a $j^{th}$ power interval, first calculating a discrimination distance $dist_{norm,n}^{k,seg,j}$ of each wind speed-power data point $(v_{norm,n}^{k,seg,j}, P_{norm,n}^{k,seg,j})$ in the normalized yaw error inherent deviation analysis data set $\{\gamma\varepsilon_{norm,n}^{k,seg,j}\}$ within the interval, further setting a suspected outlier proportion $\eta_{k,seg,j}^{AVDC}$ and determining the number $m_{AVDC}^{k,seg,j}$ of the suspected outliers within the $j^{th}$ interval, determining first $m_{AVDC}^{k,seg,j}$ pieces of data by sorting the discrimination distance $dist_{norm,n}^{k,seg,j}$ in descending order to constitute the suspected outlier set $\{Outlier_{sus,AVDC}^{k,seg,j}\}$ in the normalized yaw error inherent deviation analysis data set within the $j^{th}$ interval;

a calculation formula of the discrimination distance $dist_{norm,n}^{k,seg,j}$ is as follows:

$$dist_{norm,n}^{k,seg,j} = \begin{cases} |P_{norm,n}^{k,seg,j} - \overline{P_{norm}^{k,seg,j}}|, & seg = ws \\ |v_{norm,n}^{k,seg,j} - \overline{v_{norm}^{k,seg,j}}|, & seg = ap \end{cases}$$

where $\overline{P_{norm}^{k,seg,j}}$, $\overline{v_{norm}^{k,seg,j}}$ are respectively an average power within the $j^{th}$ wind speed interval and an average wind speed within the $j^{th}$ power interval in the normalized yaw error inherent deviation analysis data set, where n=1, 2, 3, ..., $M_{k,seg,j}'$;

3-e) carrying out, by respectively using two outlier detection algorithms of local outlier factor (LOF) and density-based spatial clustering of applications with noise (DBSCAN), discrimination outlier detection within the 2 M'intervals $\{\gamma\varepsilon_{norm,n}^{k,seg,j}\}$ in the step 3-c), a number of discrimination outliers within the $j^{th}$ interval being denoted as $m_{method}^{k,seg,j}$, a discrimination outlier set in the normalized yaw error inherent deviation data set within the $j^{th}$ interval being denoted as $\{Outlier_{jud,method}^{k,seg,j}\}$, where seg={ws, ap}, j=1, 2, 3, ..., M', n=1, 2, 3, ..., $M_{k,seg,j}'$, method={LOF, DBSCAN};

3-f) obtaining, based on a true outlier discrimination criterion, a true outlier set $\{Outlier_{true}^{k,seg,j}\}$ from the suspected outlier set $\{Outlier_{sus,AVDC}^{k,seg,j}\}$ in the normalized yaw error inherent deviation analysis data set in the step 3-d) and the discrimination outlier set $\{Outlier_{jud,method}^{k,seg,j}\}$ in the normalized yaw error inherent deviation analysis data set in the step 3-e), where seg={ws, ap}, j=1, 2, 3, ..., M', method={LOF, DBSCAN};

the true outlier discrimination criterion is defined as: for any data point Q in the yaw error inherent deviation analysis data set $\{\gamma\varepsilon_{norm,n}^{k,seg,j}\}$, if it belongs to the suspected outlier set $\{Outlier_{sus,AVDC}^{k,seg,j}\}$ and belongs to one of the LOF discrimination outlier set $\{Outlier_{jud,LOF}^{k,seg,j}\}$ or the DBSCAN discrimination outlier set $\{Outlier_{jud,DBSCAN}^{k,seg,j}\}$, then the point Q is the true outlier within the $j^{th}$ interval;

3-g) obtaining, based on the true outlier set $\{Outlier_{true}^{k,ws,j}\}$ within each wind speed interval and the true outlier set $\{Outlier_{true}^{k,ap,j}\}$ within each power interval obtained in the step 3-f) and by using a final outlier discrimination criterion, a final outlier discrimination result set $\{Outlier_k\}$ of the yaw error inherent deviation analysis data set $\{\mathcal{YE}_1^k\}$ and eliminating final outlier discrimination result set, a yaw error inherent deviation analysis standard data set, from which outliers have been eliminated, being denoted as $\{\mathcal{YE}_{std,\lambda}^k\}$;

the final outlier discrimination criterion is defined as: for any data point Q' in the yaw error inherent deviation analysis data set $\{\mathcal{YE}_1^k\}$, if its corresponding data point Q in the normalized yaw error inherent deviation analysis data set $\{\mathcal{YE}_{norm,n}^{k,seg,j}\}$ is a true outlier within a wind speed interval or within a power interval, then the point Q' is a final outlier in the yaw error inherent deviation analysis data set $\{\mathcal{YE}_1^k\}$;

3-h) determining a maximum value $v_{max}$, corresponding to a wind speed in the yaw error inherent deviation analysis standard data set $\{\mathcal{YE}_{std,1}^k\}$ obtained in the step 3-g), and further dividing, with a constant wind speed interval $\Delta v$ by which the wind speed is divided into intervals and based on the wind speed information, the yaw error inherent deviation analysis standard data set $\{\mathcal{YE}_{std,1}^k\}$ within the $k^{th}$ yaw error interval, a yaw error inherent deviation analysis standard data set $\{\mathcal{WS}_{q,m}^k\}$ within a $q^{th}$ wind speed interval being defined as:

$$\{\mathcal{WS}_{q,m}^k\}=\{(v_m,P_m)\in\{\mathcal{YE}_{std,1}^k\}|(q-1)\Delta v \le v_m < q\Delta v\} q=1,2,3,\ldots,M_k, m=1,2,3,\ldots,M_{k,q},$$

where $M_{k,q}$ is a number of pieces of data in the yaw error inherent deviation analysis standard data set $\{\mathcal{WS}_{q,m}^k\}$ within the $CO$ wind speed interval; $M_k$ is a number of wind speed intervals of the yaw error inherent deviation analysis standard data set $\{\mathcal{YE}_{std}^k/\}$ within the $k^{th}$ yaw error interval, and a calculation formula is as follows:

$$M_k = \begin{cases} \left\lceil \frac{v_{max}}{\Delta v} \right\rceil, & \frac{v_{max}}{\Delta v} \notin \mathbb{Z} \\ \frac{v_{max}}{\Delta v}, & \frac{v_{max}}{\Delta v} \notin \mathbb{Z} \end{cases},$$

where a $\lceil \cdot \rceil$ function is an up-rounding function;

3-i) calculating an average wind speed $\overline{v_q^k}$ and an average power $\overline{P_q^k}$ in the yaw error inherent deviation analysis data set $\{\mathcal{WS}_{q,m}^k\}$ within each wind speed interval, and respectively normalizing all average wind speed values and average power values with maximum-minimum normalization, to obtain a normalized average wind speed $v_{norm}^{k,q}$ and a normalized average power $P_{norm}^{k,q}$;

3-j) determining, based on the average wind speed $\overline{v_q^k}$ and the average power $\overline{P_q^k}$ a power curve fitting center point $C_k^q$ within each wind speed interval, a determination method being: if a number of pieces of data in the yaw error inherent deviation analysis standard data set $\{\mathcal{WS}_{q,m}^k\}$ within the $j^{th}$ wind speed interval is $M_{k,q}=0$, then determining that there is no power curve fitting center point; otherwise, determining that the power curve fitting center point is $C_k^q=(\overline{v_q^k}, \overline{P_q^k})$;

3-k) supplementing a definition center point $C_k^0=(0,0)$, a number of power curve fitting center points within the $k^{th}$ yaw error interval being denoted as $M_k'$, and calculating a parameter value $\bar{t}_k^r$ corresponding to each power curve fitting center point $C_k^r$, a formula being as follows:

$$\bar{t}_k^r = \begin{cases} 0, & r = 0 \\ \bar{t}_k^{r-1} + \frac{d_k^r}{d_k}, & r = 1, 2, \ldots, M_k' \end{cases}$$

where $d_k^r$ is a chord length after coordinates corresponding to two adjacent power curve fitting center points $C_k^r$ and $C_k^{r-1}$ are normalized, and $$d_k^r = \sqrt{(v_{norm}^{k,r}-v_{norm}^{k,r-1})^2+(P_{norm}^{k,r}-P_{norm}^{k,r-1})^2},$$

where $d_k$ is a total chord length after coordinates corresponding to all the power curve fitting center points are normalized, and $$d_k = \sum_{r=1}^{M_k'} d_k^r;$$

3-l) fitting the power curve within the $k^{th}$ yaw error interval by using a least squares B-spline fitting algorithm, a fitting function $B_k(t)$ being defined as follows:

$$B_k(t) = \sum_{r=0}^{M_k'} N_{r,p}(t) b_k^r \quad (t_k^{p-1} \le t \le t_k^{M_k'+1}),$$

where $N_{r,p}(t)$ is a standard function of an $r^{th}$ segment B-spline fitting function with an order p, t is an independent variable of the least square B-spline fitting function, $b_k^r$ is an $r^{th}$ control point of the least squares B-spline fitting function; $t_k^s$ is a segment node, s=0, 1, 2, ..., p−1, p, p+1, ..., $M_k'$−', $M_k'$, $M_k'$+1, ..., $M_k'$+p, and a calculation formula is as follows:

$$t_k^s = \begin{cases} 0 & s = 0, 1, 2, \ldots, p-1 \\ \frac{1}{p-1}\sum_{i=i-p+1}^{i-1} \bar{t}_k^r & s = p, p+1, \ldots, M_k'-1, M_k' \\ 1 & s = M_k'+1, \ldots, M_k'+p \end{cases}$$

3-m) determining all control points $\{b_k^r\}$ in the B-spline fitting function $B_k(t)$ based on a least squares optimization function as follows:

$$\min_{b_k^0,b_k^1,b_k^2,\ldots,b_k^{M_k'}} \sum_{r=0}^{M_k'} |B_k(\bar{t}_k^r) - C_k^r|$$

3-n) converting the solved least squares B-spline fitting function $B_k(t)$ into a polynomial form whose independent variable is the wind speed $v$, as the true power curves $\{PC_k\}$ within the $k^{th}$ yaw error interval; and 3-o) setting an interval k=k+1 to be analyzed, and repeating the step 3-b) to the step 3-n) until j>M.

As a further description, in the step 3-c) of the method, said dividing the normalized yaw error inherent deviation analysis data set $\{\mathcal{YE}_{norm,1}^k\}$ into intervals includes:

3-c-a) determining a number of intervals, into which the normalized yaw error inherent deviation analysis data set $\{\mathcal{YE}_{norm,1}^k\}$ is divided, as M'; and 3-c-b) evenly dividing the data set $\{\mathcal{YE}_{norm,1}^k\}$ with $$\frac{1}{M'}$$

as a division interval and respectively according to the wind speed and the power, to obtain the normalized yaw error inherent deviation analysis data sets $\{\mathcal{YE}_{norm,n}^{k,ws,j}\}$ and $\{\mathcal{YE}_{norm,n}^{k,ap,j}\}$ within each wind speed interval and each power interval.

As a further description, in the step 3-d) of the method, said carrying out, by using the average distance discrimination (AVDC) outlier detection algorithm, suspected outlier detection within each interval of $\{\mathcal{YE}_{norm,n}^{k,seg,j}\}$ includes an algorithm flow including:

3-d-a) setting an initial outlier detection interval j=1;

3-d-b) if the number $M_{k,seg,j}'$ of pieces of data in the normalized yaw error inherent deviation analysis data set $\{\mathcal{YE}_{norm,n}^{k,seg,j}\}$ corresponding to the $j^{th}$ interval is smaller than the given minimum threshold $\delta_{M'}$, then determining that the number $m_{AVDV}^{k,sef,j}$ of the suspected outliers within the $j^{th}$ interval is 0 and the suspected outlier set $\{Outlier_{sus,AVDV}^{k,seg,j}\}$ in the normalized yaw error inherent deviation analysis data set within the $j^{th}$ interval is $\emptyset$, and skipping to step 3-d-g) to continue the algorithm flow; otherwise, proceeding to step 3-d-c);

3-d-c) setting a proportion $\eta_{k,seg,j}^{AVDC}$ of suspected outliers in the normalized yaw error inherent deviation analysis data set $\{\mathcal{YE}_{norm,n}^{k,seg,j}\}$ within the $j^{th}$ interval, and calculating the number $m_{AVDC}^{k,seg,j}$ of the suspected outliers within the $j^{th}$ interval, a calculation formula being defined as:

$$m_{AVDC}^{k,seg,j} = \lceil M_{k,seg,j}' \times \eta_{k,seg,j}^{AVDC} \rceil,$$

where the $\lceil \cdot \rceil$ function is an up-rounding function;

3-d-d) calculating a wind speed discrimination distance $dist_{norm,n}^{k,ws,j}$ of each data point $(v_{norm,n}^{k,ws,j})$ in the normalized yaw error inherent deviation analysis data set $\{\mathcal{YE}_{norm,n}^{k,ws,j}\}$ within the $j^{th}$ wind speed interval, a calculation formula being as follows, $$dist_{norm,n}^{k,ws,j} = |P_{norm,n}^{k,ws,j} - \overline{P_{norm}^{k,ws,j}}| \; |n=1,2,3,\ldots,M_{k,ws,j}',$$

where $\overline{P_{norm}^{k,ws,j}}$ is an average power of the normalized yaw error inherent deviation analysis data set within the $j^{th}$ wind speed interval;

3-d-e) calculating the power discrimination distance $dist_{norm,n}^{k,ap,j}$ in of each data point $(v_{norm,n}^{k,ap,j}, P_{norm,n}^{k,ap,j})$ in the normalized yaw error inherent deviation analysis data set $\{\mathcal{YE}_{norm,n}^{k,ap,j}\}$ within the $j^{th}$ power interval, a calculation formula being as follows:

$$dist_{norm,n}^{k,ap,j} = |v_{norm,n}^{k,ap,j} - \overline{v_{norm}^{k,ap,j}}| \; |n=1,2,3,\ldots,M_{k,ap,j}',$$

where $\overline{v_{norm}^{k,ap,j}}$ is an average wind speed of the normalized yaw error inherent deviation analysis data set within the $j^{th}$ power interval;

3-d-f) sorting respectively the discrimination distance data set $\{dist_{norm,n}^{k,seg,j}\}$ within the $j^{th}$ interval in descending order, and respectively selecting the first $m_{AVDC}^{k,seg,j}$ pieces of data in the sorted discrimination distance data set, to constitute the suspected outlier set $\{Outlier_{sus,AVDC}^{k,seg,j}\}$ in the normalized yaw error inherent deviation analysis data set within the $j^{th}$ interval, where $n=1, 2, 3, \ldots, M_{k,ap,j}'$; and 3-d-g) setting the detection interval j=j+1, and repeating the step 3-d-b) to the step 3-d-f) until j>M'.

As a further description, in the step 4) of the method, the quantitative performance indexes $PI_k$ are as follows:

$$PI_k = \frac{0.5 N_h (P_j^{k,mid} + P_{j-1}^{k,mid}) \sum_{j=1}^{M_k} [F(v_{j,cor}^{k,mid}) - F(v_{j-1,cor}^{k,mid})]}{CAP}$$

where $N_h$ is a value of hours into which 1 year is converted; CAP is a rated power of the wind turbine to be analyzed; $v_{j,cor}^{k,mid}$ is an median wind speed within the $k^{th}$ yaw error interval and within a $j^{th}$ wind speed interval, $v_{j,cor}^{k,mid} = 0.5(2j-1)\Delta v$ and $v_{0,cor}^{k,mid} = 0$; $P_j^{k,mid}$ is a power value corresponding to $v_{j,cor}^{k,mid}$ on the true power curve $\{PC_k\}$ within the $k^{th}$ yaw error interval; and the $F(\cdot)$ function is a cumulative probability distribution function of Rayleigh distribution, and a formula is as follows:

$$F(v) = 1 - e^{-\pi v^2 / (4 v_{ave}^2)}$$

where $v_{ave}$ is an annual average wind speed of the wind turbine to be analyzed.

Compared with the related art, the present disclosure has following innovative advantages and significant effects:

1) in view of the problem that an existing wind turbine power curve outlier detection and discrimination algorithm does not consider an influence of different working conditions during a discriminating procedure, segmentation studies are carried out by constraining the operation conditions through a wind speed and power interval division manner, to ensure that the power curve data is unified to a certain extent in the operation conditions of the wind turbine; moreover, in combination with advantages of multiple outlier detection algorithms, an application limitation of a single outlier detection algorithm is broken through, such that the wind turbine power curve fitting result is more realistic and accurate;

2) a method of identification and compensation of an inherent deviation of a yaw error of a wind turbine based on the power curve analysis is innovatively proposed, which fills in the technical gap of the data analysis-based intelligent identification and compensation technology in the field of performance improvement of wind turbines.

3) a wind turbine performance improvement flow, which includes processes of the wind turbine true power curve fitting, construction of the power curve performance quantitative index, the yaw error inherent deviation identification, and the yaw error inherent deviation compensation strategy formulation and so on, is designed, which has a strong practicality, reliability and scalability.

DESCRIPTION OF EMBODIMENTS

The specific implementation method and working principle of the present disclosure are described in detail below with reference to the accompanying drawings.

Embodiment

Since it is difficult for wind conditions under which a wind turbine in a wind farm operates in different time periods to be completely consistent, for verification of validity of a patented method of the present disclosure, data used in this embodiment are simulation data of GH Bladed 3.82 under a same type of wind turbines and a same wind file, and the data are used to analyze and study the method of identification and compensation of an inherent deviation of a yaw error of a wind turbine. A data sampling interval is 10 min. Data information is for 5 years, and there is a total of 284,405 pieces. Relevant information included in a data set is shown in Table 1 and Table 2.

TABLE 1

Part of simulation data of a certain type of wind turbine under a certain wind file under GH Bladed 3.82

| Data No. | Wind Speed | Active Power | Ambient Temperature | Ambient Pressure | Yaw Error |
|---|---|---|---|---|---|
| ... | ... | ... | ... | ... | ... |
| 105679 | 4.2992 | 81.0290 | 25.0000 | 100463.2887 | 5.7852 |
| 105680 | 4.5417 | 81.8810 | 25.0000 | 100463.2887 | 15.2980 |
| 105681 | 4.9667 | 82.8700 | 25.0000 | 100463.2887 | 1.6641 |
| ... | ... | ... | ... | ... | ... |
| 235640 | 11.6990 | 1504.7000 | 25.0000 | 100463.2887 | 6.0619 |
| 235641 | 11.5200 | 1549.5000 | 25.0000 | 100463.2887 | 9.1317 |
| 235642 | 11.1470 | 1550.0000 | 25.0000 | 100463.2887 | −0.0520 |
| ... | ... | ... | ... | ... | ... |

TABLE 2

Simulation data set variable information for a certain type of wind turbine under GH Bladed 3.82

| Variable Name | Variable Meaning | Variable Unit |
|---|---|---|
| Wind Speed v | current wind turbine nacelle wind speed | m/s |
| Active Power P | current wind turbine active power | kW |
| Ambient Temperature T | wind turbine operation environment temperature | °C |
| Ambient Pressure B | wind turbine operation environment pressure | Pa |
| Yaw Error θ | current wind turbine yaw error | ° |

Figure 3:
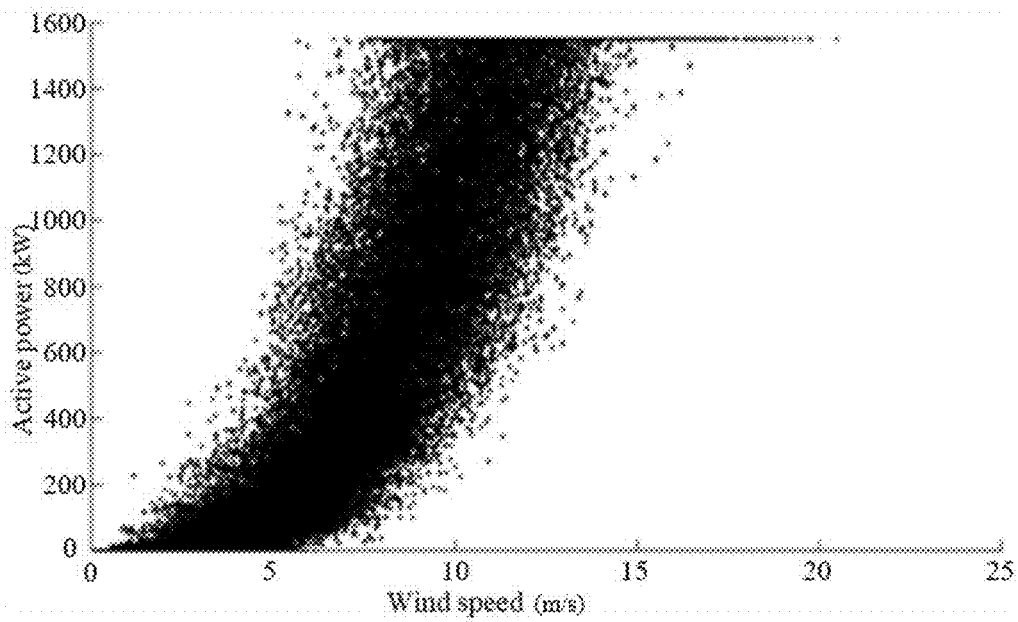
FIG. 3 is a scatter plot of original data of a wind turbine power curve in step 1) of an embodiment of the present disclosure.
Figure 4:
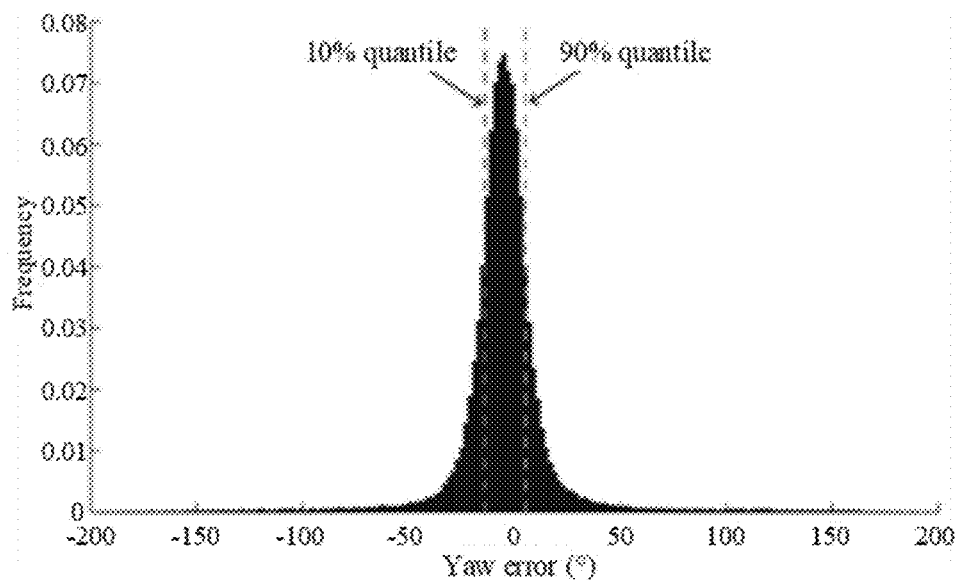
FIG. 4 is a yaw error frequency distribution histogram before compensation in step 2-a) of an embodiment of the present disclosure.

It is worth mentioning that the yaw error obtained by measurement under GH Bladed has no yaw error inherent deviation that exists in a measurement process of the anemometer in an actual application process. Thus, in the simulation process, a phenomenon that there is a yaw error inherent deviation of −5° in the actual process is simulated in such a manner in which the measured value is artificially added by 5°. In this embodiment, an implementation of the yaw error inherent deviation identification and compensation method is performed by using all the above simulation data by default, and the result of the method is the obtained identification result of the yaw error inherent deviation of the wind turbine and the effectiveness of the method is verified by compensation methods. The detailed implementation steps are as follows:

1), reading, based on identification and compensation requirements of the inherent deviation of the yaw error of the wind turbine to be analyzed, a total of N pieces of operation data information of the wind turbine obtained by measurement in a SCADA system of the wind turbine to be analyzed in a corresponding requirement cycle, the information including a wind speed $\{v_i\}$, an active power $\{P_i\}$ and a yaw error $\{\theta_i\}$, and an information data set being denoted as a wind turbine yaw error inherent deviation analysis data set $\{X_i\}$, where i=1, 2, 3, ..., N; according to description of the data set variable information listed in Table 1 and Table 2, the data set in this embodiment includes all necessary information in this step, and a result shown in FIG. 3 is a scatter plot of original data of a power curve of the wind turbine in this step;

2) dividing the wind turbine yaw error inherent deviation analysis data set $\{X_i\}$ in the step 1) into M intervals by a certain yaw error interval, a number of pieces of data in a $k^{th}$ yaw error interval being denoted as $N_k$, the yaw error inherent deviation analysis data set being denoted as $\{Y\varepsilon_\iota^k\}=\{(v_\iota, P_\iota)\}$, where k=1, 2, 3, ..., M, and ι=1, 2, 3, ..., $N_k$; steps of a preferred method for an interval division of the yaw error inherent deviation analysis data set $\{X_i\}$ are as follows but not limited thereto:

2-a) plotting a frequency distribution histogram of the yaw error $\{\theta_i\}$, and setting, based on distribution of the frequency distribution histogram, a lower bound $\theta_{lb}$ and an upper bound $\theta_{ub}$ of the yaw error interval to be analyzed; the yaw error frequency distribution histogram in this embodiment is as shown in FIG. 4, and around-rounding values of 10% and 90% quantiles selected from the drawing are used as the lower bound $\theta_{lb}$ and the upper bound $\theta_{ub}$ of the yaw error to be analyzed, and values of the 10% and 90% quantiles are −13.984° and 5.273°, and it is determined by further around-rounding that $\theta_{lb}$ is −14° and $\theta_{ub}$ is 5°;

2-b) setting the number M of interval into which the yaw error inherent deviation analysis data set $\{X_i\}$ is divided; in this embodiment, M takes 20;

2-c) dividing, with $$\frac{1}{M}(\theta_{ub} - \theta_{lb})$$

as a yaw error division interval, the yaw error inherent deviation analysis data set $\{X_i\}$, and retaining only wind speed and power information as the yaw error inherent deviation analysis data set $\{\mathcal{YE}_\iota^k\}$. In this embodiment, due to space limitation, only a data scatter plot of the power curve corresponding to a yaw error interval [−10°, 0°] is given, as shown in FIG. 5.

Figure 5:
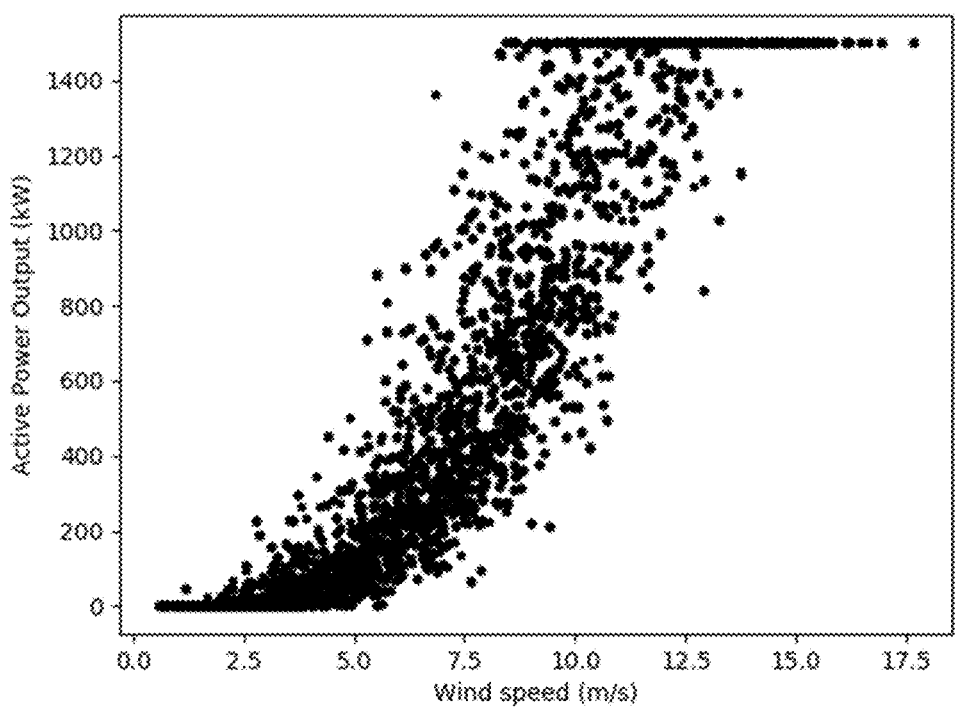
FIG. 5 is a diagram showing a correlation result of original scatter points of a normalized power curve and wind speed & power divisions within a yaw error interval [−1°, 0°] in steps 2-c) to 3-c) of an embodiment of the present disclosure.

3) based on the yaw error inherent deviation analysis data set $\{\mathcal{YE}_\iota^k\}$ within the M intervals in the step 2), respectively fitting out M true power curves, and a true power curve within a $k^{th}$ yaw error interval being denoted as $\{PC_k\}$, where k=1, 2, 3, . . . , M; a preferred algorithm flow for obtaining the wind turbine true power curve is as follows:

3-a) setting a true power curve obtaining initial interval k=1;

3-b) normalizing wind speed information and the power information in the yaw error inherent deviation analysis data set $\{\mathcal{YE}_\iota^k\}$ within the $k^{th}$ yaw error interval by maximum-minimum normalization, the normalized yaw error inherent deviation analysis data set being denoted as $\{\mathcal{YE}_{norm,\iota}^k\}$, where ι=1, 2, 3, . . . , $N_k$; in this embodiment, the scatter plot of the normalized yaw error inherent deviation analysis data set $\{\mathcal{YE}_{norm,\iota}^k\}$ is shown by black data points in FIG. 5;

3-c) dividing, respectively according to a certain wind speed interval (ws) and power interval (ap), the normalized yaw error inherent deviation analysis data set $\{\mathcal{YE}_{norm,\iota}^k\}$ in the step 3-b) into M' intervals, and a number of pieces of data within a $j^{th}$ interval being denoted as $M_{k,seg,j}'$, the normalized yaw error inherent deviation analysis data set within the $j^{th}$ interval being denoted as $\{\mathcal{YE}_{norm,n}^{k,seg,j}\}$, where seg={ws, ap}, j=1, 2, 3, . . . , M', n=1, 2, 3, . . . , $M_{k,seg,j}'$; a preferred division method for the normalized yaw error inherent deviation analysis data set $\{\mathcal{YE}_{norm,\iota}^k\}$ is specifically as follows but not limited thereto:

3-c-a) determining the number of intervals into which the normalized yaw error inherent deviation analysis data set $\{\mathcal{YE}_{norm,\iota}^k\}$ is divided as M'; in this embodiment, M' takes 20;

3-c-b) evenly dividing the data set $\{\mathcal{YE}_{norm,\iota}^k\}$ with $$\frac{1}{M'}$$

as a division interval and respectively according to the wind speed and the power, to obtain the normalized yaw error inherent deviation analysis data sets $\{\mathcal{YE}_{norm,n}^{k,ws,j}\}$ and $\{\mathcal{YE}_{norm,n}^{k,ap,j}\}$ within each wind speed interval and each power interval. In this embodiment, the wind speed & power division relevant results are shown by a dashed line and a dot dashed line in FIG. 5.

Figure 6:
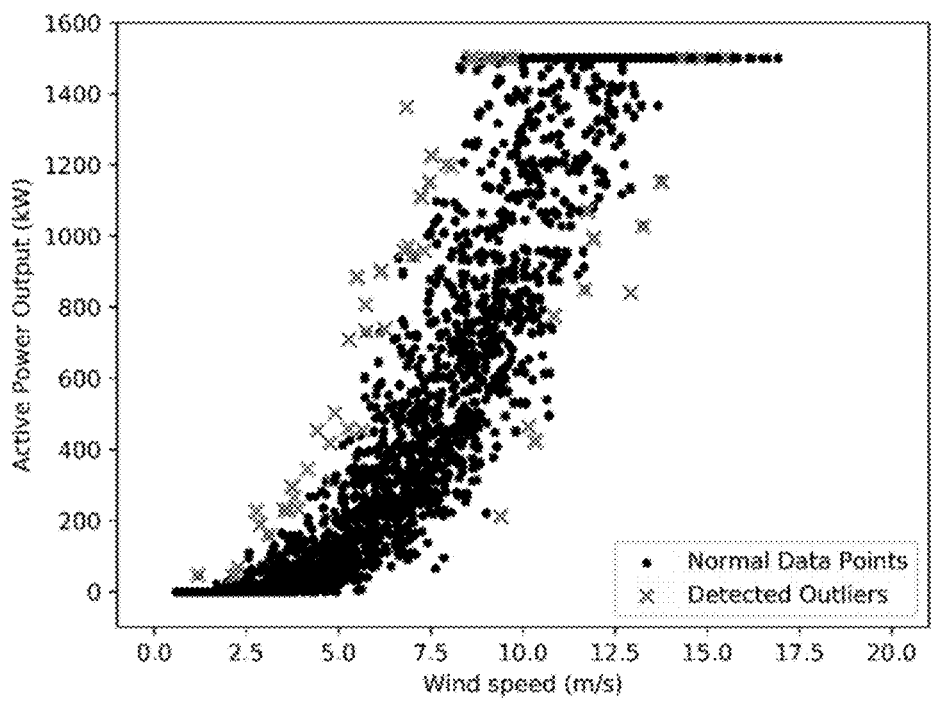
FIG. 6 is a diagram showing an AVDC suspected outlier detection result under wind speed division data within a yaw error interval [−1°, 0°] in an embodiment.
Figure 7:
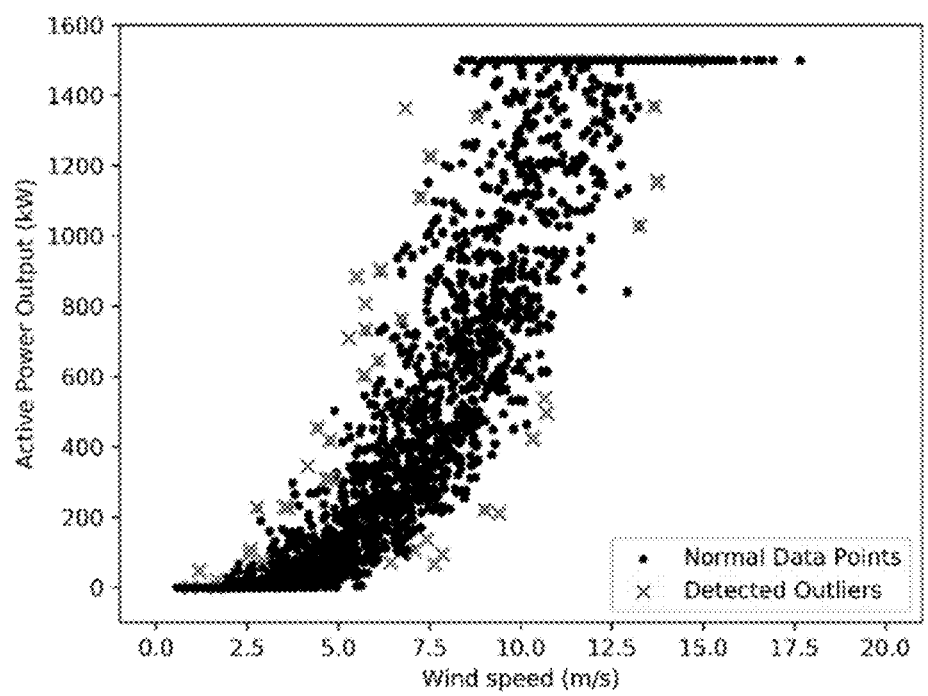
FIG. 7 is a diagram showing an AVDC suspected outlier detection result under power division data within a yaw error interval [−1°, 0°] in an embodiment.
Figure 8:
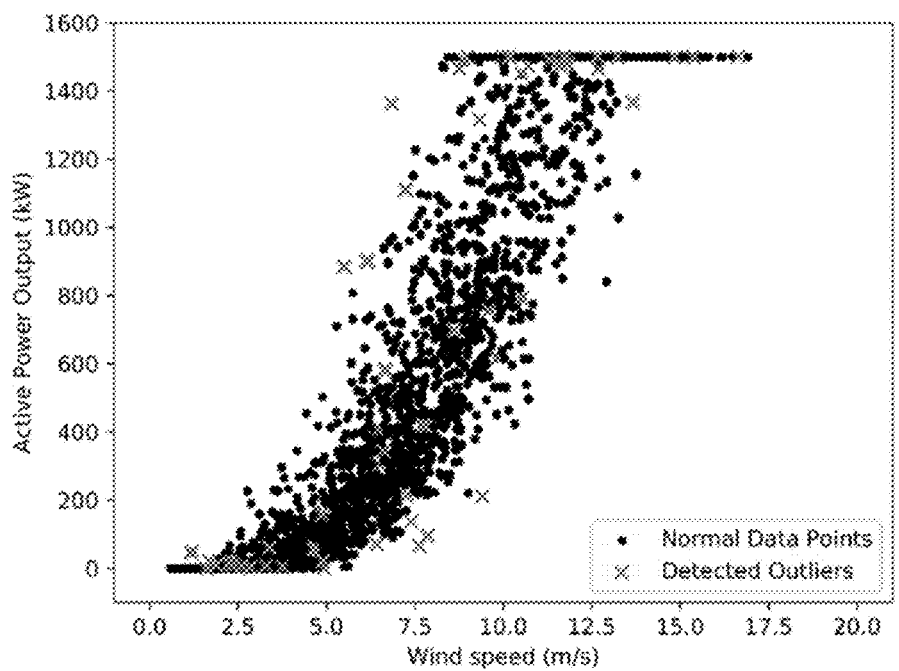
FIG. 8 and FIG. 9 are respectively diagrams showing an LOF discrimination outlier detection result and a DBSCAN discrimination outlier detection result under wind speed division data within a yaw error interval [−1°, 0°] in an embodiment.

3-d) carrying out, by using an average distance discrimination (AVDC) outlier detection algorithm, suspected outlier detection within 2 M' intervals $\{\mathcal{YE}_{norm,n}^{k,seg,j}\}$ in the step 3-c), and the number of the suspected outliers within the $j^{th}$ interval being denoted as $m_{AVDC}^{k,seg,j}$, a suspected outlier set in the normalized yaw error inherent deviation analysis data set being denoted as $\{Outliers_{sus,AVDC}^{k,seg,j}\}$, where seg={ws, ap}, j=1, 2, 3, . . . , M' n=1, 2, 3, . . . , $M_{k,seg,j}'$; the average distance discrimination (AVDC) outlier detection algorithm is used to detect suspected outliers within each interval in $\{\mathcal{YE}_{norm,n}^{k,seg,j}\}$ and a detailed flow of the algorithm is as follows:

3-d-a) setting an initial outlier detection interval j=1;

3-d-b) if the number $M_{k,seg,j}'$ of pieces of data in the normalized yaw error inherent deviation analysis data set $\{\mathcal{YE}_{norm,n}^{k,seg,j}\}$ corresponding to the $j^{th}$ interval is smaller than a given minimum threshold $\delta_{M'}$, then determining that the number $m_{AVDC}^{k,seg,j}$ of the suspected outliers within the $j^{th}$ interval is 0 and the suspected outlier set $\{Outlier_{sus,AVDC}^{k,seg,j}\}$ in the normalized yaw error inherent deviation analysis data set within the $j^{th}$ interval is Ø, and skipping to a step 3-d-g) to continue the flow; otherwise, proceeding to a step 3-d-c);

3-d-c) setting a proportion $\eta_{k,seg,j}^{AVDC}$ of suspected outliers in the normalized yaw error inherent deviation analysis data set $\{\mathcal{YE}_{norm,n}^{k,seg,j}\}$ within the $j^{th}$ interval, and calculating the number $m_{AVDC}^{k,seg,j}$ of the suspected outliers within the $j^{th}$ interval, and a calculation formula is defined as:

$$m_{AVDC}^{k,seg,j} = \lceil M_{k,seg,j}' \times \eta_{k,seg,j}^{AVDC} \rceil,$$

where the $\lceil \cdot \rceil$ function is an up-rounding function;

3-d-d) calculating a wind speed discrimination distance $dist_{norm,n}^{k,ws,j}$ of each data point $(v_{norm,n}^{k,ws,j}, P_{norm,n}^{k,ws,j})$ in the normalized yaw error inherent deviation analysis data set $\{\mathcal{YE}_{norm,n}^{k,ws,j}\}$ within a $j^{th}$ wind speed interval, and a calculation formula is as follows, $$dist_{norm,n}^{k,ws,j} = |P_{norm,n}^{k,ws,j} - \overline{P_{norm}^{k,ws,j}}| \; n=1,2,3,\ldots, M_{k,ws,j}'$$

where $\overline{P_{norm}^{k,ws,j}}$ is an average power of the normalized yaw error inherent deviation analysis data set within the $j^{th}$ wind speed interval;

3-d-e) calculating the power discrimination distance $dist_{norm,n}^{k,ap,j}$ of each data point $(v_{norm,n}^{k,ap,j}, P_{norm,n}^{k,ap,j})$ in the normalized yaw error inherent deviation analysis data set $\{\mathcal{YE}_{norm,n}^{k,ap,j}\}$ within the $j^{th}$ power interval, and a calculation formula is as follows:

$$dist_{norm,n}^{k,ap,j} = |v_{norm,n}^{k,ap,j} - \overline{v_{norm}^{k,ap,j}}| \; n=1,2,3,\ldots, M_{k,ap,j}'$$

where $\overline{v_{norm}^{k,ap,j}}$ is an average wind speed of the normalized yaw error inherent deviation analysis data set within the $j^{th}$ power interval;

3-d-f) sorting respectively the discrimination distance data set $\{dist_{norm,n}^{k,seg,j}\}$ within the $j^{th}$ interval in descending order, and respectively selecting the first $m_{AVDV}^{k,seg,j}$ data in the sorted discrimination distance data set to constitute the suspected outlier set $\{Outlier_{sus,AVDV}^{k,seg,j}\}$ in the normalized yaw error inherent deviation analysis data set within the $j^{th}$ interval, where n=1, 2, 3, . . . , $M_{k,ap,j}'$;

3-d-g) setting the detection interval j=j+1, and repeating the step 3-d-b) to the step 3-d-f) until j>M'. Due to space limitations, all relevant analysis about the outliers in this embodiment omits calculation processes and results of each process parameter. Values of relevant important parameters are taken as follows: taking the given minimum threshold SM, as 10 and taking the suspected outlier proportion $\eta_{k,seg,j}^{AVDC}$ as 0.02. Finally, the detected suspected outliers in the normalized yaw error inherent deviation data set according to the wind speed interval (ws) and the power interval (ap) are respectively indicated by "x" symbols in FIG. 6 and FIG. 7, and the remaining normal data points are indicated by "•" symbols.

Figure 9:
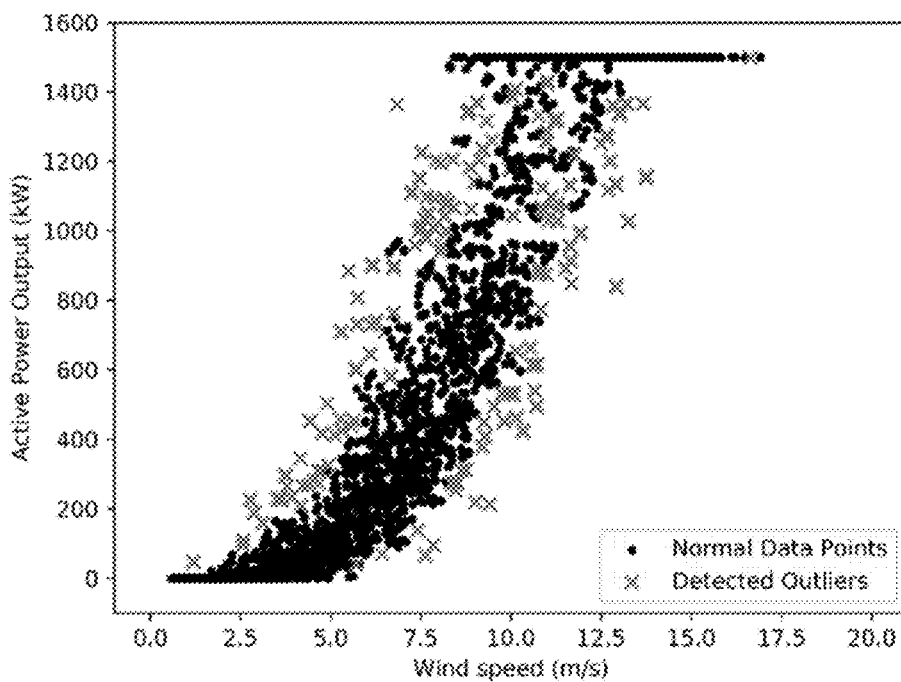
Figure 10:
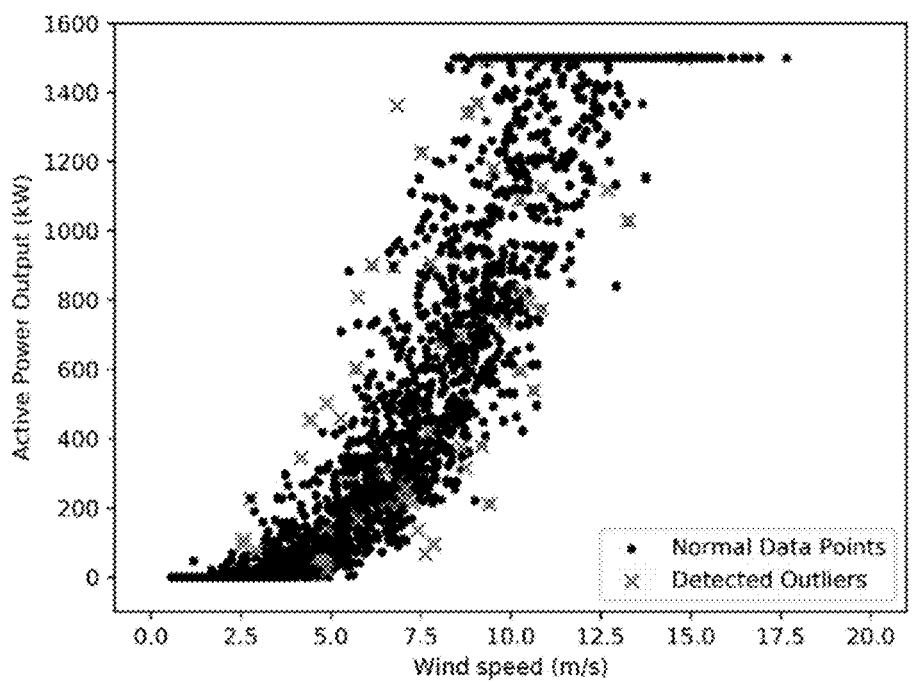
FIG. 10 and FIG. 11 are respectively diagrams showing an LOF discrimination outlier detection result and a DBSCAN discrimination outlier detection result under power division data within a yaw error interval [−1°, 0°] in an embodiment.
Figure 11:
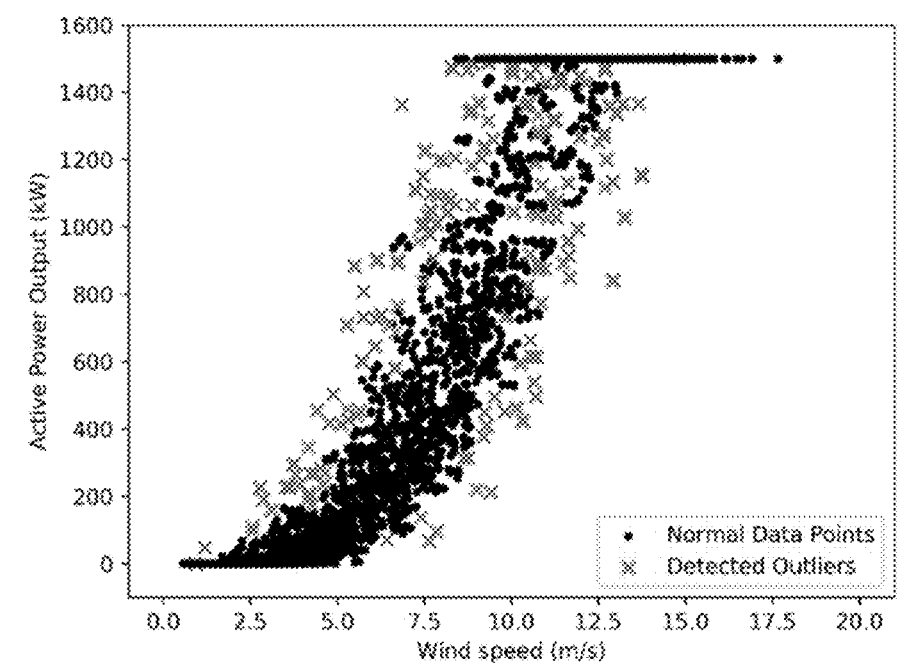

3-e) carrying out, by respectively using two outlier detection algorithms of local outlier factor (LOF) and density-based spatial clustering of applications with noise (DB-SCAN), discrimination outlier detection within the 2 M' intervals { $\mathcal{YE}_{norm,n}^{k,seg,j}$ } in the step 3-c), and the number of the discrimination outliers within the $j^{th}$ interval being denoted as $m_{method}^{k,seg,j}$, a discrimination outlier set in the normalized yaw error inherent deviation data set within the $j^{th}$ interval being denoted as {Outlier$_{jud,method}^{k,seg,j}$}, where seg={ws, ap}, j=1, 2, 3, . . . , M', n=1, 2, 3, . . . , $M_{k,seg,j}'$, method={LOF, DBSCAN}; in this embodiment, values of the relevant important parameters about the LOF discrimination outlier detection are taken as follows: taking the given minimum threshold $\delta_{M'}$ as 10, taking the LOF discrimination outlier proportion $\eta_{k,seg,j}^{LOF}$ as 0.02, taking a neighborhood parameter k in the k distance calculation as 10; values of the relevant important parameters about the DBSCAN discrimination outlier detection are taken as follows: taking the given minimum threshold $\delta_{M'}$ as 10, taking the E neighborhood discrimination radius eps as 0.02, taking a core point discrimination parameter MinPts as 10. Finally, the detected LOF and DBSCAN discrimination outliers in the normalized yaw error inherent deviation data set according to the wind speed interval (ws) and the power interval (ap) are respectively indicated by the "x" symbols in FIG. 9, FIG. 10 and FIG. 11, and the remaining normal data points are indicated by the "•" symbols.

Figure 12:
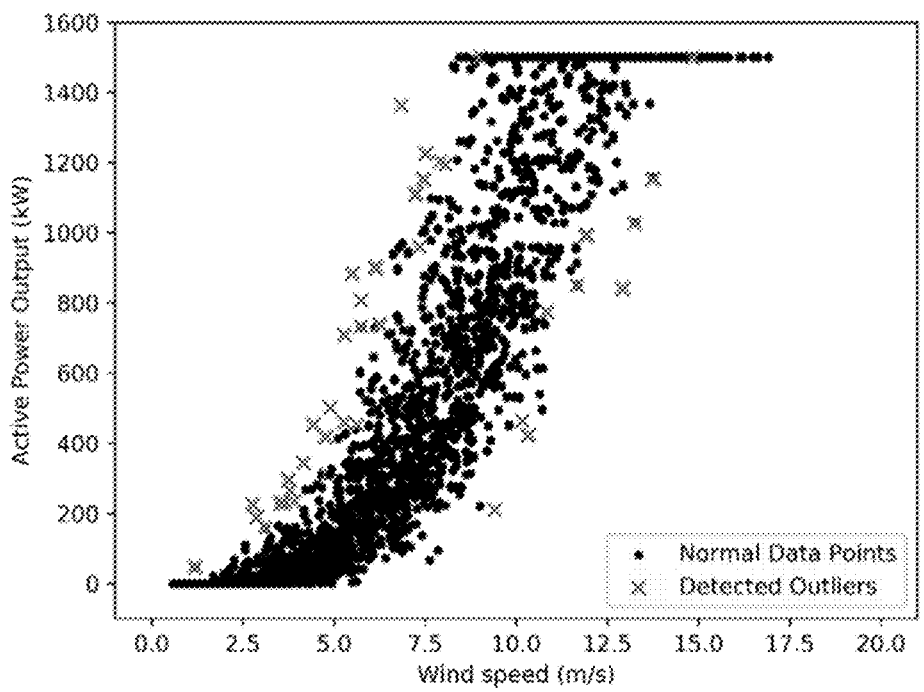
FIG. 12 is a diagram showing a true outlier detection result under wind speed division data within a yaw error interval [−1°, 0°] in an embodiment.
Figure 13:
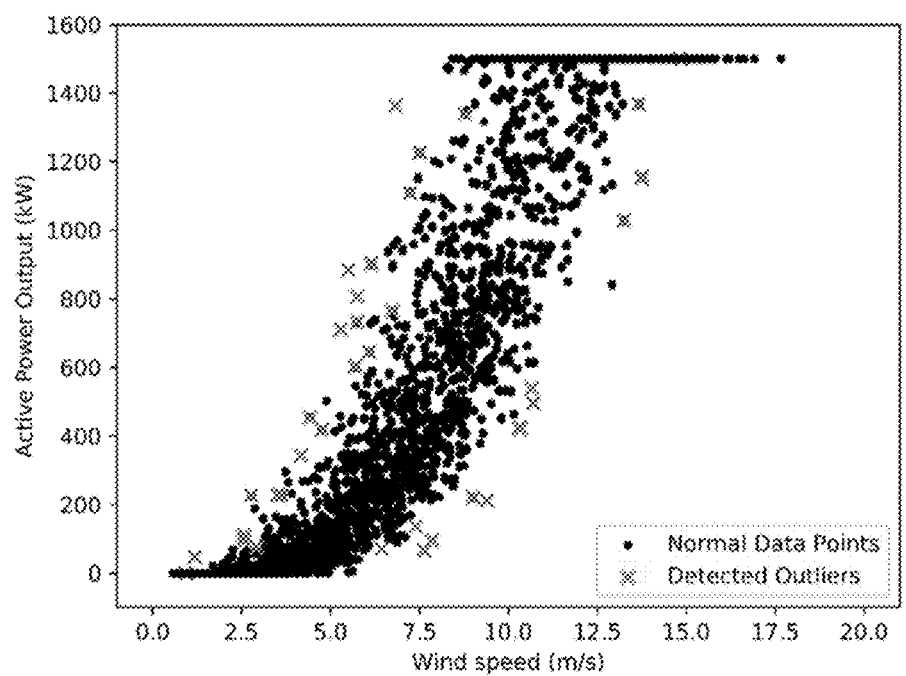
FIG. 13 is a diagram showing a true outlier detection result under power division data within a yaw error interval [−1°, 0°] in an embodiment.

3-f) obtaining, based on a true outlier discrimination criterion, a true outlier set {Outlier$_{true}^{k,seg,j}$} from the suspected outlier set {Outliers$_{sus,AVDC}^{k,seg,j}$} in the normalized yaw error inherent deviation analysis data set in the step 3-d) and the discrimination outlier set {Outlier$_{jud,method}^{k,seg,j}$} in the normalized yaw error inherent deviation analysis data set in the step 3-e), where seg={ws, ap}, j=1, 2, 3, . . . , M', method={LOF, DBSCAN};

The true outlier discrimination criterion is defined as: for any data point Q in the yaw error inherent deviation analysis data set { $\mathcal{YE}_{norm,n}^{k,seg,j}$ } within the $j^{th}$ interval, if the data point Q belongs to the suspected outlier set {Outlier$_{sus,AVDC}^{k,seg,j}$} and belongs to one of the LOF discrimination outlier set {Outlier$_{jud,LOF}^{k,seg,j}$} or DBSCAN discrimination outlier set {Outlier$_{jud,DBSCAN}^{k,seg,j}$}, then the point Q is a true outlier within the $j^{th}$ interval; in this embodiment, the detected true outliers in the normalized yaw error inherent deviation analysis data set according to the wind speed interval (ws) and the power interval (ap) determined based on the true outlier determination criterion are respectively indicated by the "x" symbols in FIG. 12 and FIG. 13, and the remaining normal data points are indicated by the "•" symbols.

Figure 14:
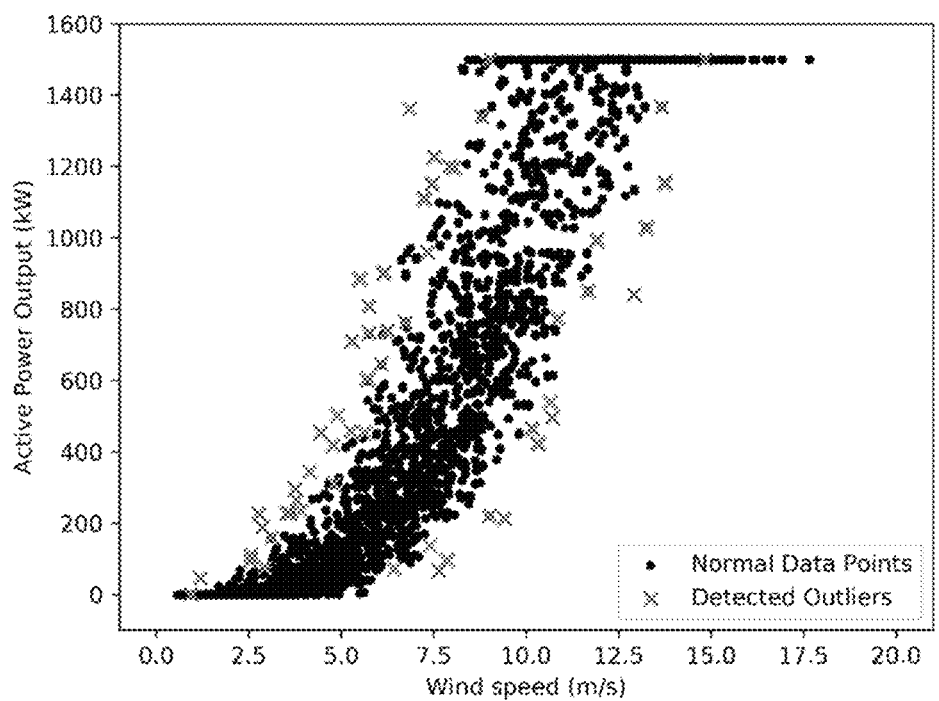
FIG. 14 is a diagram showing a final outlier detection result of a yaw error inherent deviation analysis data set within a yaw error interval [−1°, 0°] in an embodiment.

3-g) obtaining, based on the true outlier set {Outlier$_{true}^{k,ws,j}$} within each wind speed interval and the true outlier set {Outlier$_{true}^{k,ap,j}$} within each power interval obtained in the step 3-f) and by using a final outlier discrimination criterion, a final outlier discrimination result set {Outlier$_k$} of the yaw error inherent deviation analysis data set { $\mathcal{YE}_1^k$ } and eliminating it, and a yaw error inherent deviation analysis standard data set, from which outliers have been eliminated, being denoted as { $\gamma\Sigma_{std,1}^k$ };

The final outlier discrimination criterion is defined as: for any data point Q' in the yaw error inherent deviation analysis data set { $\mathcal{YE}_1^k$ }, if its corresponding data point Q in the normalized yaw error inherent deviation analysis data set { $\mathcal{YE}_{norm,n}^{k,seg,j}$ } is a true outlier within a certain wind speed interval or a true outlier within a certain power interval, then the point Q' is a final outlier of the yaw error inherent deviation analysis data set { $\mathcal{YE}_1^k$ }. In this embodiment, the detected true outliers of the normalized yaw error inherent deviation analysis data set based on the final outlier determination criterion, i.e., the data set {Outlier$_k$}, are indicated by the "x" symbols in FIG. 14, and the remaining normal data points are indicated by the "•" symbols.

3-h) determining a maximum value $v_{max}$ corresponding to a wind speed in the yaw error inherent deviation analysis standard data set { $\mathcal{YE}_{std,1}^k$ } obtained in the step 3-g); and further dividing, with a constant wind speed interval $\Delta v$ by which the wind speed is divided into intervals and based on the wind speed information, the yaw error inherent deviation analysis standard data set { $\mathcal{YE}_{std,1}^k$ } within the $k^{th}$ yaw error interval, then the yaw error inherent deviation analysis standard data set { $\mathcal{WS}_{std,1}^k$ } within a $q^{th}$ wind speed interval being defined as:

{ $\mathcal{WS}$ }={$(v_m,P_m)\in$ { $\mathcal{YE}_{Std,1}^k$ }|$(q-1)$
$\Delta v \leq v_m \leq v_m < q\Delta v$}$q$=1,2,3, . . . ,$M_k$,$m$=1, 2,3, . . . ,$M_{k,q}$, where $M_{k,q}$ is the number of pieces of data in the yaw error inherent deviation analysis standard data set { $\mathcal{WS}_{q,m}^k$ } within the $q^{th}$ wind speed interval; $M_k$ is the number of wind speed intervals of the yaw error inherent deviation analysis standard data set { $\mathcal{YE}_{std,1}^k$ } within the $k^{th}$ yaw error interval. A calculation formula is as follows:

$$M_k = \begin{cases} \lceil \frac{v_{max}}{\Delta v} \rceil, & \frac{v_{max}}{\Delta v} \notin \mathbb{Z} \\ \frac{v_{max}}{\Delta v}, & \frac{v_{max}}{\Delta v} \in \mathbb{Z} \end{cases}$$

where a $\lceil \cdot \rceil$ function is an up-rounding function;

3-i) calculating an average wind speed $\overline{v_q^k}$ and an average power $\overline{P_q^k}$ in the yaw error inherent deviation analysis data set { $\mathcal{WS}_{q,m}^k$ } within each wind speed interval, and respectively normalizing all average wind speed values and average power values with maximum-minimum normalization, to obtain a normalized average wind speed $v_{norm}^{k,q}$ and a normalized average power $P_{norm}^{k,q}$;

3-j) determining, based on the average wind speed $\overline{v_q^k}$ and the average power $\overline{P_q^k}$, a power curve fitting center point $C_k^q$ within each wind speed interval, and a determination method is as follows: if the number of pieces of data in the yaw error inherent deviation analysis standard data set { $\mathcal{WS}_{q,m}^k$ } within the $j^{th}$ wind speed interval is $M_{k,q}$=0, then determining that there is no power curve fitting center point within this interval; otherwise, determining that the power curve fitting center point within this interval is $C_k^q$=($\overline{v_q^k}$, $\overline{P_q^k}$);

3-k) supplementing a definition center point $C_k^0=(0,0)$, the number of the power curve fitting center points within the $k^{th}$ yaw error interval being denoted as $M_k'$, calculating a parameter value $\bar{t}_k^r$ corresponding to each power curve fitting center point $C_k^r$, and a formula is as follows:

$$\bar{t}_k^r = \begin{cases} 0, & r=0 \\ \bar{t}_k^{r-1} + \dfrac{d_k^r}{d_k}, & r=1,2,\ldots,M_k' \end{cases}$$

where $d_k^r$ is a chord length after coordinates corresponding to two adjacent power curve fitting center points $C_k^r$ and $C_k^{r-1}$ are normalized, i.e., $$d_k^r = \sqrt{(v_{norm}^{k,r} - v_{norm}^{k,r-1})^2 + (P_{norm}^{k,r} - P_{norm}^{k,r-1})^2},$$

$d_k$ is a total chord length after coordinates corresponding to all the power curve fitting center points are normalized, i.e., $$d_k = \sum_{r=1}^{M_k'} d_k^r;$$

3-l) fitting the power curve within the $k^{th}$ yaw error interval by using a least squares B-spline fitting algorithm, and a fitting function $B_k(t)$ thereof is defined as follows:

$$B_k(t) = \sum_{r=0}^{M_k'} N_{r,p}(t) b_k^r \quad \left(t_k^{p-1} \le t \le t_k^{M_k'+1}\right)$$

where $N_{r,p}(t)$ is a standard function of the $r^{th}$ segment B-spline fitting function with an order p, t is an independent variable of the least square B-spline fitting function, $b_k^r$ is an $r^{th}$ control point of the least squares B-spline fitting function; $t_k^s$ is a segment node, s=0, 1, 2, ..., p–1, p, p+1, ..., $M_k'$–1, $M_k'$, $M_k'$+1, ..., $M_k'$+p, and a calculation formula is as follows:

$$t_k^s = \begin{cases} 0 & s=0,1,2,\ldots,p-1 \\ \dfrac{1}{p-1}\sum_{k=i-p+1}^{i-1} \bar{t}_k^r & s=p,p+1,\ldots,M_k'-1,M_k' \\ 1 & s=M_k'+1,\ldots,M_k'+p \end{cases}$$

3-m) determining, based on a following least squares optimization function, all the control points $\{b_k^r\}$ in the B-spline fitting function $B_k(t)$:

$$\min_{b_k^0, b_k^1, b_k^2, \ldots, b_k^{M_k'}} \sum_{r=0}^{M_k'} |B_k(\bar{t}_k^r) - C_k^r|$$

Figure 15:
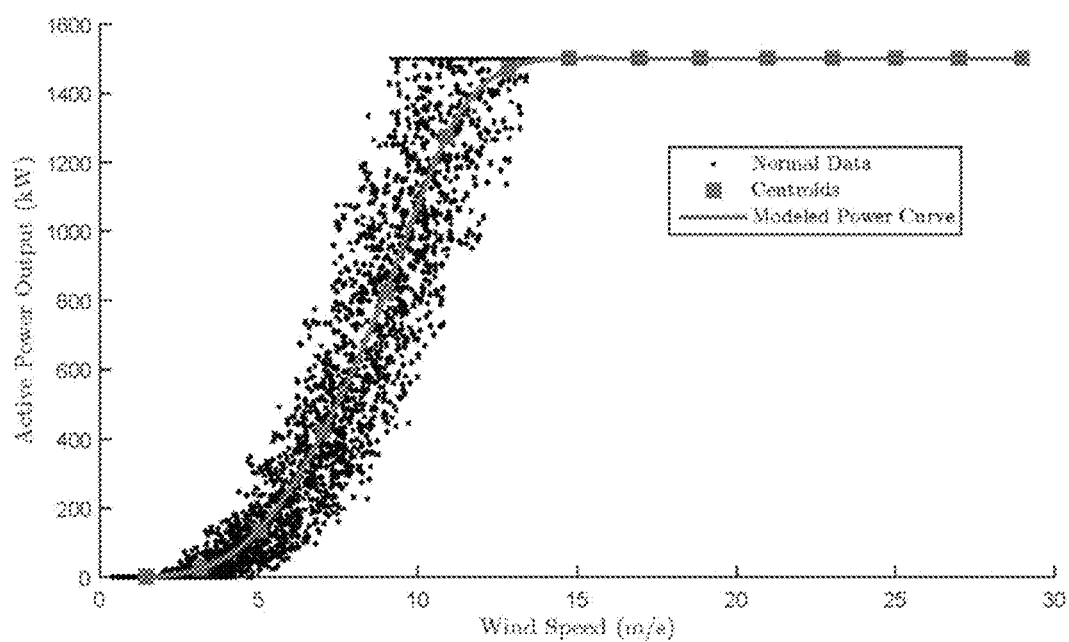
FIG. 15 is a diagram showing a true power curve correlation result of a yaw error inherent deviation analysis standard data set within a yaw error interval [−1°, 0°] in an embodiment.

3-n) converting the solved least squares B-spline fitting function $B_k(t)$ into a polynomial form whose independent variable is the wind speed v, as the true power curve result within the $k^{th}$ yaw error interval $\{PC_k\}$;

3-o) setting the interval k=k+1 to be analyzed, and repeating the step 3-b) to the step 4-n) until j>M. Due to space limitations, calculation processes and secondary results of each process parameter about fitting of the power curve in this embodiment are omitted. Values of the relevant important parameters are taken as follows: the corresponding maximum value of the wind speed is $v_{max}$=28.9760 m/s, the constant wind speed interval is $\Delta v$=2 m/s, the number of the wind speed intervals in the power curve related data within a $14^{th}$ yaw error interval [−1°, 0°] is 15, and the corresponding true power curve fitting center points and the fitting result are indicated by "n" symbols and the curve shown in FIG. 15.

Figure 16:
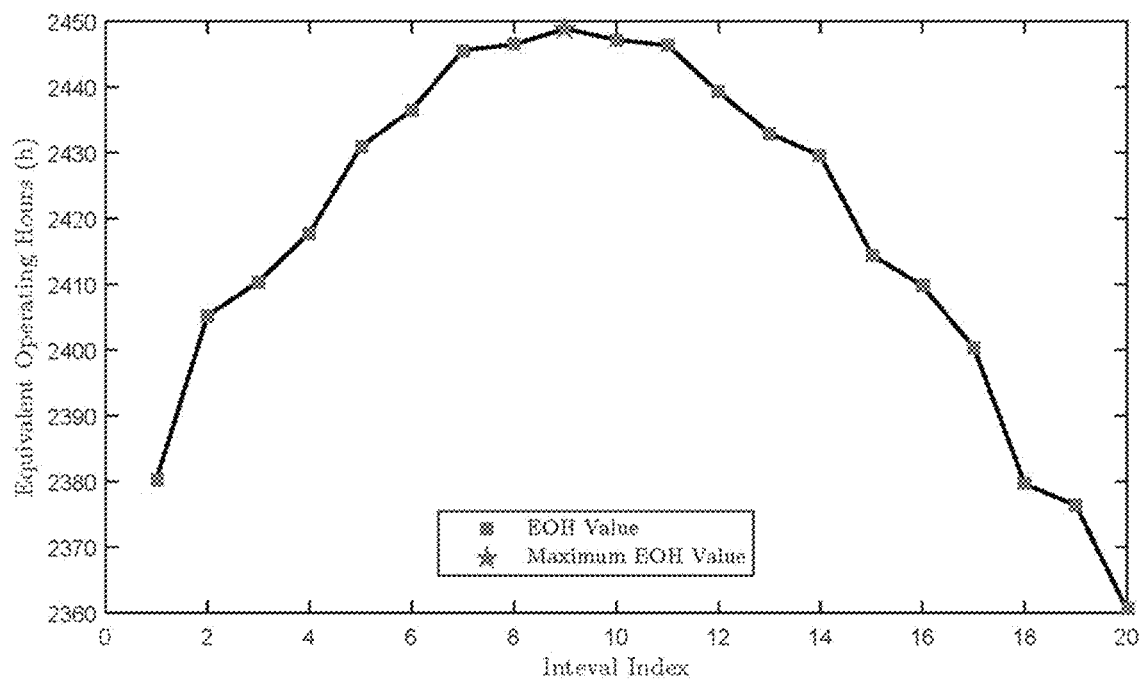
FIG. 16 and FIG. 17 are diagrams showing power curve quantitative performance index results within respective yaw error intervals before and after a yaw error inherent deviation compensation in an embodiment.

4) calculating respective quantitative performance indexes $PI_k$ of the true power curves $\{PC_k\}$ within the M yaw error intervals in the step 3), where k=1, 2, 3, ..., M; a preferred definition of the quantitative performance index $PI_k$ is as follows but not limited to:

$$PI_k = \frac{0.5N_h(P_j^{k,mid} + P_{j-1}^{k,mid})\sum_{j=1}^{M_k}\left[F(v_{j,cor}^{k,mid}) - F(v_{j-1,cor}^{k,mid})\right]}{CAP}$$

where $N_h$ is a value of hours into which 1 year is converted; CAP is a rated power of the wind turbine to be analyzed; $v_{j,cor}^{k,mid}$ is an median wind speed within the $k^{th}$ yaw error interval and within the $j^{th}$ wind speed interval, i.e., $v_{j,cor}^{k,mid}=0.5(2j-1)\Delta v$, and $v_{0,cor}^{k,mid}$ 0; $P_j^{k,mid}$ is a power value corresponding to $v_{j,cor}^{k,mid}$ on the true power curve $\{PC_k\}$ within the $k^{th}$ yaw error interval, $v_0^{k,mid}=0$; the F(·) function is a cumulative probability distribution function of the Rayleigh distribution, and the specific formula is as follows:

$$F(v) = 1 - e^{-(\pi v^2)/(4 v_{ave}^2)}$$

where $v_{ave}$ is an annual average wind speed of the wind turbine to be analyzed. In this embodiment, values of the relevant important parameters are taken as follows: $N_h$ is taken as 8760 when considering that there are 365 days in 1 year; CAP is the rated power value of this type of wind turbine, and taken as 1550 kW; $v_{ave}$ is taken as the average wind speed 7 m/s of the simulated wind file, and the calculation result of the respective quantitative performance indexes $PI_k$ of the true power curves within the corresponding 20 yaw error intervals are shown in FIG. 16.

Figure 17:
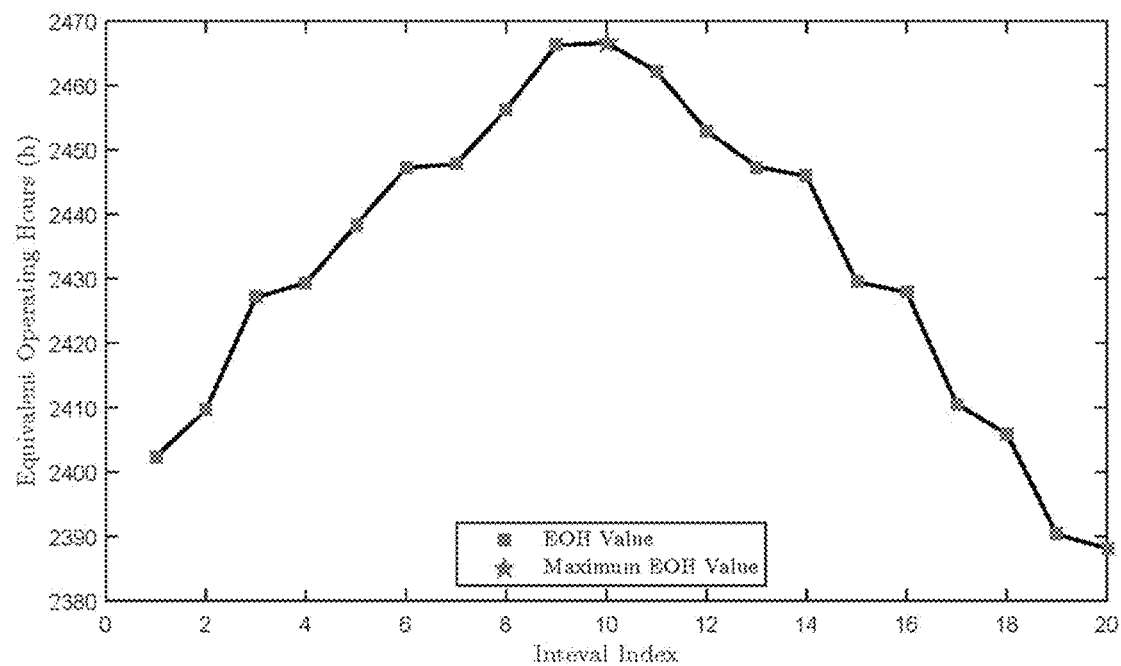

5) determining an identification result of a yaw error inherent deviation value $\theta_{im}$ of the wind turbine through a yaw error inherent deviation identification criterion, and directly compensating an actual measured value θ of the yaw error with the deviation value $\theta_{im}$ directly in a form of an increment, so as to obtain the final compensated true yaw error θ', i.e., θ'=θ+$\theta_{im}$;

the yaw error inherent deviation identification criterion being defined as follows: sorting the quantitative performance indexes $PI_k$ of the true power curves $\{PC_k\}$ within all the M yaw error intervals in the step 4) in descending order, and determining an interval subscript k' corresponding to a maximum quantitative performance index $PI_{max}$, and the calculation formula of the identification result of the yaw error inherent deviation value $\theta_{im}$ is as follows:

$$\theta_{im} = \theta_{lb} + \frac{2k'-1}{2M}(\theta_{ub} - \theta_{lb})$$

where $\theta_{lb}$ and $\theta_{ub}$ are the lower and upper bounds of the yaw error interval to be analyzed, respectively. In this embodiment, the maximum value $PI_{max}$ of the quantitative performance index $PI_k$ of the true power curve in FIG. 16 is labeled with a "★" symbol. It can be seen that the interval number corresponding to the maximum value is No. 9, that is, the yaw error interval is [−6°, −5°], then the identification result of the yaw error inherent deviation value can be calculated, according to the identification result of the yaw error inherent deviation value $\theta_{im}$, to be −5.5°; further based on a yaw error inherent deviation compensation strategy, the yaw error measurement value θ is changed into a corrected θ' by artificially adding 5.5°, i.e., θ'=θ+5.5°; the corrected result is used as the yaw control input to re-carry out data simulation on the wind turbine under the same wind file after compensation, and the calculation results of the respective quantitative performance indexes $PI_k$ of the true power curve shown in FIG. 17 can be obtained through the same analysis process. The relevant important parameters are as follows: the 10% and 90% quantiles of the frequency distribution histogram of the yaw error are −9.681° and 10.498° respectively, that is, the lower bound $θ_{lb}$ and the upper bound $θ_{ub}$ of the yaw error are −10° and 10°, respectively; the number M of the interval divisions is taken as 20; the corresponding maximum value of the wind speed is $v_{max}$=28.9760 m/s, the constant wind speed interval Δv=2 m/s, the other key parameters are the same as those before compensation. It can be seen from FIG. 17 that after identification and compensation of the yaw error inherent deviation, the interval number corresponding to the maximum value is No. 10. That is, the identification range of the yaw error inherent deviation after compensation is [0°, 1°], which shows that the compensation of the inherent deviation improves an effect of a yaw control in the presence of the inherent deviation. It can also be seen from the power curve quantitative index result value that the power curve quantitative index results under the same yaw position also have significant improvements ranging from 20 h to 30 h, and the performance is improved by approximately 0.8%~1.2% compared with the performance before the identification compensation.

So far, the validity and practicability of the method of identification and compensation of an inherent deviation of a yaw error of a wind turbine based on the true power curve have been successfully verified on the simulation data set of the GH Bladed 3.82 simulation software.

Figure 1:
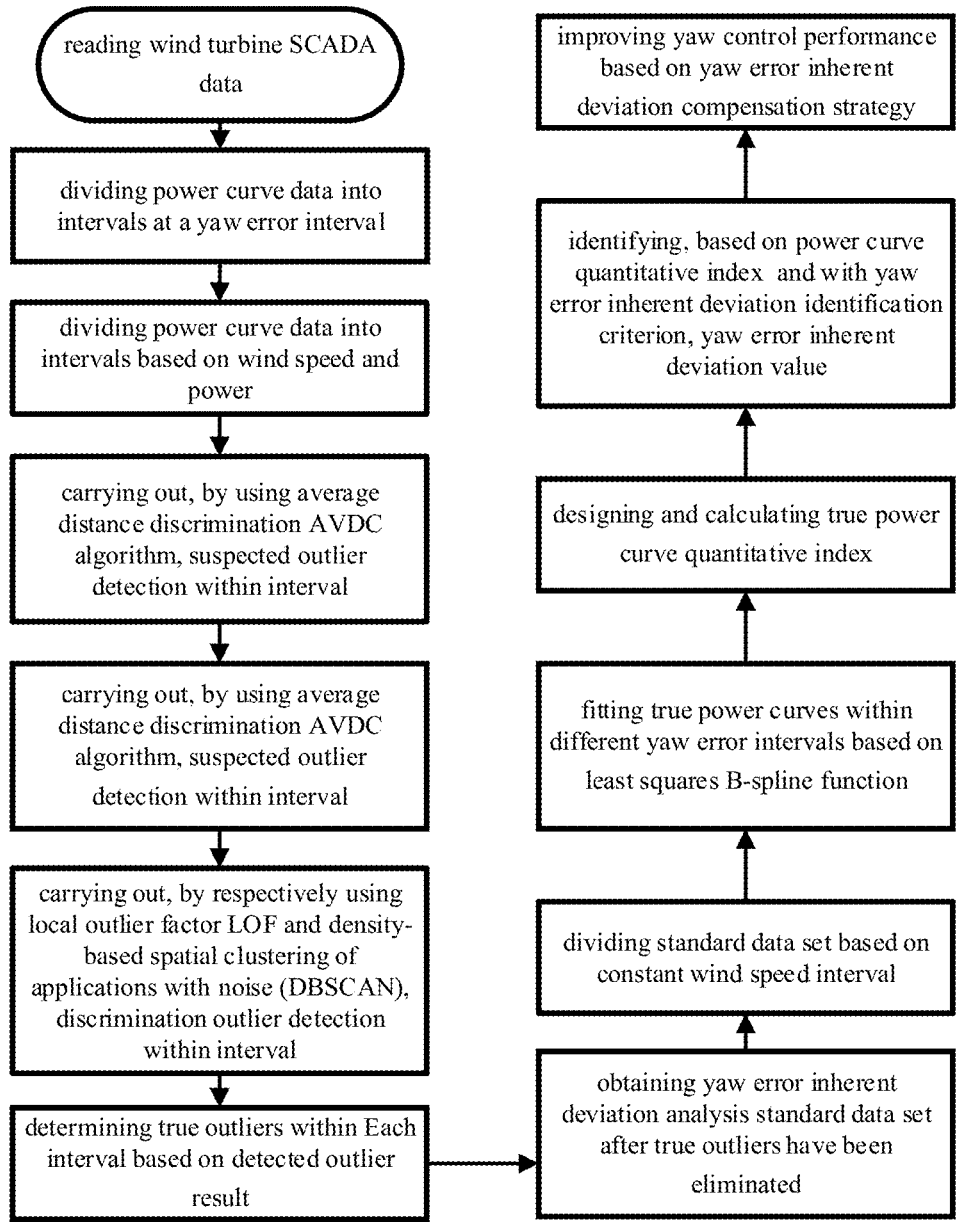
FIG. 1 is a flow chart of a method of identification and compensation of an inherent deviation of a yaw error of a wind turbine based on a power curve analysis according to the present disclosure.
Figure 2:
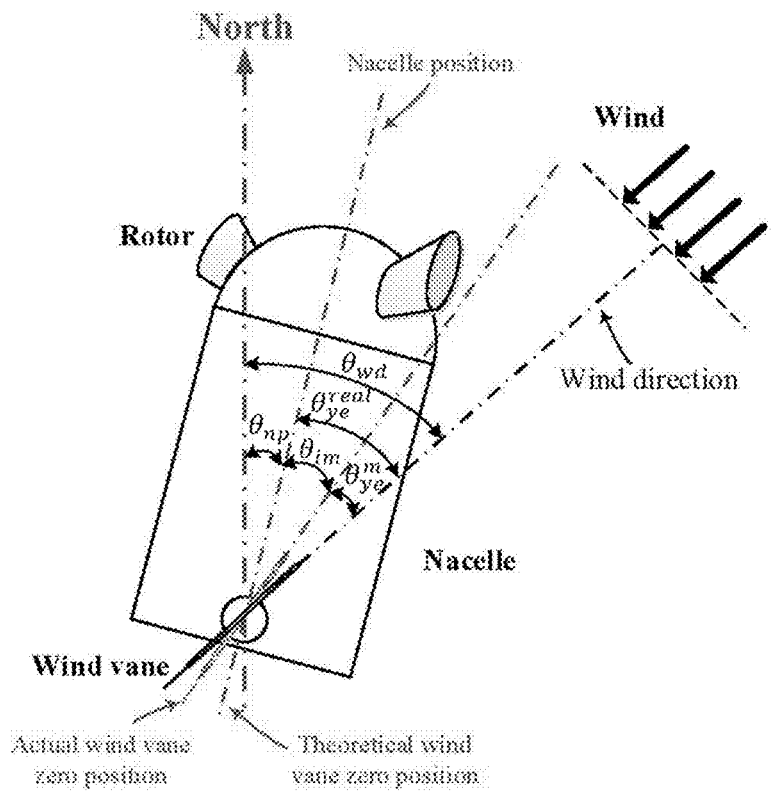
FIG. 2 is a schematic diagram showing an angle related relationship of a wind turbine yaw error inherent deviation and other angles in an application field of the present disclosure.

The identification and compensation method of the yaw error inherent deviation of the wind turbine based on the true power curve in the present disclosure mainly includes processes of the yaw error-based interval division, the wind turbine power curve data outlier detection, the wind turbine true power curve fitting, the power curve quantitative index calculation, and the yaw error inherent deviation identification and compensation, and so on. FIG. 1 shows a specific flow of implementation and application of the wind turbine yaw error inherent error identification and compensation method based on the true power curve. The entire embodiment follows the flow shown in FIG. 1 to analyze based on the wind turbine SCADA data, and finally achieve the performance improvement requirements of the wind turbine by fitting the wind turbine true power curves within different yaw error intervals and based on the identification criterion and compensation strategy of the yaw error inherent deviation. FIG. 2 to FIG. 17 show the results of the respective processes in the identification and compensation flow of the wind turbine yaw error inherent deviation using the method of identification and compensation of an inherent deviation of a yaw error of a wind turbine based on the true power curve of the present disclosure, which has a strong application value and significance for enterprises with the performance improvement requirements on wind turbines.

What is claimed is:

1. A method of identification and compensation of an inherent deviation of a yaw error of a wind turbine and control of a wind turbine machine yaw angle based on a true power curve, wherein the method comprises:

step 1) of reading, based on identification and compensation requirements of the inherent deviation of the yaw error of the wind turbine to be analyzed, a total of N pieces of operation data information of the wind turbine obtained by measurement in a SCADA system of the wind turbine to be analyzed in a corresponding requirement cycle, the operation data information comprising a wind speed $\{v_i\}$, an active power $\{P_i\}$ and the yaw error $\{θ_i\}$, an information data set being denoted as a wind turbine yaw error inherent deviation analysis data set $\{X_i\}$, where i=1, 2, 3, . . . , N;

step 2) of dividing the wind turbine yaw error inherent deviation analysis data set $\{X_i\}$ in the step 1) into M intervals at a yaw error interval, a number of pieces of data in a $k^{th}$ yaw error interval being denoted as $N_k$, the yaw error inherent deviation analysis data set intervals being $\{\mathcal{YE}_\iota^k\}=\{(v_\iota, P_\iota)\}$, where k=1, 2, 3, . . . , M, and ι=1, 2, 3, . . . , $N_k$;

step 3) of respectively fitting out M true power curves based on the yaw error inherent deviation analysis data set $\{\mathcal{YE}_\iota^k\}$ within the M intervals in the step 2), the true power curve within the $k^{th}$ yaw error interval being denoted as $\{PC_k\}$, where k=1, 2, 3, . . . , M;

step 4) of calculating respective quantitative performance indexes $PI_k$ of the true power curves $\{PC_k\}$ within the M yaw error inherent deviation analysis data set intervals in the step 3), where k=1, 2, 3, . . . , M;

step 5) of determining an identification result of a yaw error inherent deviation value $θ_{im}$ of the wind turbine through a yaw error inherent deviation identification criterion, and directly compensating an actual measured value θ of the yaw error with the yaw error inherent deviation value $θ_{im}$ directly in a form of an increment, so as to obtain a final compensated true yaw error θ', where θ'=θ+$θ_{im}$;

wherein the yaw error inherent deviation identification criterion is defined by: sorting the respective quantitative performance indexes $PI_k$ of the true power curves $\{PC_k\}$ within all the M yaw error inherent deviation analysis data set intervals in the step 4) in descending order, and determining an interval subscript k' corresponding to a maximum quantitative performance index $PI_{max}$; and wherein a calculation formula of the identification result of the yaw error inherent deviation value $θ_{im}$ is as follows:

$$θ_{im} = θ_{lb} + \frac{2k'-1}{2M}(θ_{ub} - θ_{lb}),$$

where $θ_{lb}$ and $θ_{ub}$ are a lower bound and an upper bound of a yaw error interval to be analyzed, respectively;

step 6) of controlling the wind turbine machine yaw angle with the calculation formula for the identification result of the yaw error inherent deviation value $θ_{im}$.

2. The method of identification and compensation of the inherent deviation of the yaw error of the wind turbine and control of a wind turbine machine yaw angle based on the true power curve according to claim 1, wherein in the step 2), said dividing the yaw error inherent deviation analysis data set $\{X_i\}$ into intervals comprises:

step 2-a) of plotting a frequency distribution histogram of the yaw error $\{θ_i\}$, and setting, based on distribution of the frequency distribution histogram, the lower bound $θ_{lb}$ and the upper bound $θ_{ub}$ of the yaw error interval to be analyzed;

step 2-b) of setting a number of intervals, into which the yaw error inherent deviation analysis data set $\{X_i\}$ is divided, as M; and step 2-c) of dividing, with $$\frac{1}{M}(\theta_{ub} - \theta_{lb})$$

as a yaw error division interval, the yaw error inherent deviation analysis data set $\{X_i\}$, and retaining only wind speed and power information as the yaw error inherent deviation analysis data set $\{\mathcal{YE}_1^k\}$.

3. The method of identification and compensation of the inherent deviation of the yaw error of the wind turbine and control of a wind turbine machine yaw angle based on the true power curve according to claim 1, wherein in the step 3), a flow for obtaining the true power curves of the wind turbine within M yaw error intervals comprises:

step 3-a) of setting a true power curve obtaining initial interval k=1;

step 3-b) of normalizing wind speed information and power information in the yaw error inherent deviation analysis data set $\{\mathcal{YE}_1^k\}$ within the $k^{th}$ yaw error interval by maximum-minimum normalization, the normalized yaw error inherent deviation analysis data set being denoted as $\{\mathcal{YE}_{norm,\iota}^k\}$, where $\iota=1, 2, 3, \ldots, N_k$;

step 3-c) of dividing, respectively according to a wind speed interval (ws) and a power interval (ap), the normalized yaw error inherent deviation analysis data set $\{\mathcal{YE}_{norm,\iota}^k\}$ in the step 3-b) into M' intervals, a number of pieces of data within a $j^{th}$ interval being denoted as $M_{k,seg,j}'$, the normalized yaw error inherent deviation analysis data set within the $j^{th}$ interval being denoted as $\{\mathcal{YE}_{norm,n}^{k,seg,j}\}$, where seg={ws,ap}, j=1, 2,3, ... ,M', n=1,2,3, ... ,$M_{k,seg,j}'$;

step 3-d) of carrying out, by using an average distance discrimination (AVDC) outlier detection algorithm, suspected outlier detection within 2 M' intervals $\{\mathcal{YE}_{norm,n}^{k,seg,j}\}$ in the step 3-c), a number of suspected outliers within the $j^{th}$ interval being denoted as $m_{AVDC}^{k,seg,j}$, a suspected outlier set in the normalized yaw error inherent deviation analysis data set being denoted as $\{\text{Outlier}_{sus,AVDC}^{k,seg,j}\}$, where seg={ws, ap}, j=1, 2, 3, ... , M', n=1, 2, 3, ... , $M_{k,seg,j}'$;

wherein the average distance discrimination (AVDC) outlier detection algorithm lies in: for an interval in which the number $M_{k,seg,j}'$ of pieces of data is smaller than a given minimum threshold $\delta_{M'}$, ... , determining that the suspected outlier set $\{\text{Outlier}_{sus,AVDC}^{k,seg,j}\}$ in the normalized yaw error inherent deviation analysis data set within the interval is Ø; otherwise, for a $j^{th}$ wind speed interval or a $j^{th}$ power interval, first calculating a discrimination distance $\text{dist}_{norm,n}^{k,seg,j}$ of each wind speed-power data point ($v_{norm,n}^{k,seg,j}$, $P_{norm,n}^{k,seg,j}$) in the normalized yaw error inherent deviation analysis data set $\{\mathcal{YE}_{norm,n}^{k,seg,j}\}$ within the interval, further setting a suspected outlier proportion $\eta_{k,seg,j}^{AVDC}$ and determining the number $m_{AVDC}^{k,seg,j}$ of the suspected outliers within the $j^{th}$ interval, determining first $m_{AVDC}^{k,seg,j}$ pieces of data by sorting the discrimination distance $\text{dist}_{norm,n}^{k,seg,j}$ in descending order to constitute the suspected outlier set $\{\text{Outlier}_{sus,AVDC}^{k,seg,j}\}$ in the normalized yaw error inherent deviation analysis data set within the $j^{th}$ interval;

wherein a calculation formula of the discrimination distance $\text{dist}_{norm,n}^{k,seg,j}$ is as follows:

$$\text{dist}_{norm,n}^{k,seg,j} = \begin{cases} |P_{norm,n}^{k,seg,j} - \overline{P_{norm}^{k,seg,j}}|, & seg = ws \\ |v_{norm,n}^{k,seg,j} - \overline{v_{norm}^{k,seg,j}}|, & seg = ap \end{cases},$$

where $\overline{P_{norm}^{k,seg,j}}$, $\overline{v_{norm}^{k,seg,j}}$ are respectively an average power within the $j^{th}$ wind speed interval and an average wind speed within the $j^{th}$ power interval in the normalized yaw error inherent deviation analysis data set, where n=1, 2, 3, . . . , $M_{k,seg,j}'$;

step 3-e) of carrying out, by respectively using two outlier detection algorithms of local outlier factor (LOF) and density-based spatial clustering of applications with noise (DBSCAN), discrimination outlier detection within the 2 M' intervals $\{\mathcal{YE}_{norm,n}^{k,seg,j}\}$ in the step 3-c), a number of discrimination outliers within the $j^{th}$ interval being denoted as $m_{method}^{k,seg,j}$, a discrimination outlier set in the normalized yaw error inherent deviation data set within the $j^{th}$ interval being denoted as $\{\text{Outlier}_{jud,method}^{k,seg,j}\}$, where seg={ws,ap}, j=1, 2, 3, ... ,M', n=1, 2, 3, ... , $M_{k,seg,j}'$, method={LOF, DBSCAN};

step 3-f) of obtaining, based on a true outlier discrimination criterion, a true outlier set $\{\text{Outlie}_{true}^{k,seg,j}\}$ from the suspected outlier set $\{\text{Outlier}_{sus,AVDC}^{k,seg,j}\}$ in the normalized yaw error inherent deviation analysis data set in the step 3-d) and the discrimination outlier set $\{\text{Outlier}_{jud,method}^{k,seg,j}\}$ in the normalized yaw error inherent deviation analysis data set in the step 3-e), where seg={ws, ap}, j=1, 2, 3, ... , M', method={LOF, DBSCAN};

wherein the true outlier discrimination criterion is defined as: for any data point Q in the normalized yaw error inherent deviation analysis data set $\{\mathcal{YE}_{norm,n}^{k,seg,j}\}$ if the data point Q belongs to the suspected outlier set $\{\text{Outlier}_{sus,AVDC}^{k,seg,j}\}$ and belongs to one of the LOF discrimination outlier set $\{\text{Outlier}_{jud,LOF}^{k,seg,j}\}$ or DBSCAN discrimination outlier set $\{\text{Outlie}_{jud,DBSCAN}^{k,seg,j}\}$, then the point Q is a true outlier within the $j^{th}$ interval;

step 3-g) of obtaining, based on the true outlier set $\{\text{Outlier}_{true}^{k,ws,j}\}$ within each wind speed interval and the true outlier set $\{\text{Outlier}_{true}^{k,ws,j}\}$ within each power interval obtained in the step 3-f) and by using a final outlier discrimination criterion, a final outlier discrimination result set $\{\text{Outlier}_{true}^{k,ws,j}\}$ of the yaw error inherent deviation analysis data set $\{\mathcal{YE}_1^k\}$ and eliminating final outlier discrimination result set, a yaw error inherent deviation analysis standard data set, from which outliers have been eliminated, being denoted as $\{\mathcal{YE}_1^k\}$;

wherein the final outlier discrimination criterion is defined as: for any data point Q' in the yaw error inherent deviation analysis data set $\{\mathcal{YE}_1^k\}$, if its corresponding data point Q in the normalized yaw error inherent deviation analysis data set $\{\mathcal{YE}_{norm,n}^{k,seg,j}\}$ is a true outlier within a wind speed interval or within a power interval, then the point Q' is a final outlier in the yaw error inherent deviation analysis data set $\{\mathcal{YE}_1^k\}$;

step 3-h) of determining a maximum value $v_{max}$ corresponding to a wind speed in the yaw error inherent deviation analysis standard data set $\{\mathcal{YE}_{std,1}^k\}$ obtained in the step 3-g), and further dividing, with a constant wind speed interval $\Delta v$ by which the wind speed is divided into intervals and based on the wind speed information, the yaw error inherent deviation analysis standard data set $\{\mathcal{YE}_{std,1}{}^k\}$ within the $k^{th}$ yaw error interval, a yaw error inherent deviation analysis standard data set $\{\mathcal{WS}_{q,m}{}^k\}$ within a $q^{th}$ wind speed interval being defined as:

$$\{\mathcal{WS}\} = \{(v_m, P_m) \in \{\mathcal{YE}_{Stdh}{}^k\} | (q-1)\Delta v \leq v_m \leq v_m < q\Delta v\} q=1,2,3, \ldots, M_k, m=1,2,3, \ldots, M_{k,q},$$

where $M_{k,q}$ is a number of pieces of data in the yaw error inherent deviation analysis standard data set $\{\mathcal{WS}_{q,m}{}^k\}$ within the $q^{th}$ wind speed interval; $M_k$ is a number of wind speed intervals of the yaw error inherent deviation analysis standard data set $\{\mathcal{YE}_{std,1}{}^k\}$ within the $k^{th}$ yaw error interval, and a calculation formula is as follows:

$$M_k = \begin{cases} \left\lceil \frac{v_{max}}{\Delta v} \right\rceil, & \frac{v_{max}}{\Delta v} \notin \mathbb{Z} \\ \frac{v_{max}}{\Delta v}, & \frac{v_{max}}{\Delta v} \in \mathbb{Z} \end{cases},$$

where a $\lceil \cdot \rceil$ function is an up-rounding function;

step 3-i) of calculating an average wind speed $\overline{v_q^k}$ and an average power $\overline{P_q^k}$ in the yaw error inherent deviation analysis data set $\{\mathcal{WS}_{q,m}{}^k\}$ within each wind speed interval, and respectively normalizing all average wind speed values and average power values, to obtain a normalized average wind speed $v_{norm}{}^{k,q}$ and a normalized average power $P_{norm}{}^{k,q}$;

step 3-j) of determining, based on the average wind speed $\overline{v_q^k}$ and the average power $\overline{P_q^k}$ a power curve fitting center point $C_k^q$ within each wind speed interval, a determination method being: if a number of pieces of data in the yaw error inherent deviation analysis standard data set $\{\mathcal{WS}_{q,m}{}^k\}$ within the $j^{th}$ wind speed interval is $M_{k,q}=0$, then determining that there is no power curve fitting center point; otherwise, determining that the power curve fitting center point is $C_k^q = (\overline{v_q^k}, \overline{P_q^k})$;

step 3-k) of supplementing a definition center point $C_k^0 = (0,0)$, a number of power curve fitting center points within the $k^{th}$ yaw error interval being denoted as $M_k'$, and calculating a parameter value $\bar{t}_k$ corresponding to each power curve fitting center point $C_k^r$, a formula being as follows:

$$\bar{t}_k^r = \begin{cases} 0, & r = 0 \\ \bar{t}_k^{r-1} + \frac{d_k^r}{d_k}, & r = 1,2,\ldots, M_k' \end{cases}$$

where $d_k^r$ is a chord length after coordinates corresponding to two adjacent power curve fitting center points $C_k^r$ and $C_k^{r-1}$ are normalized, and $$d_k^r = \sqrt{(v_{norm}{}^{k,r} - v_{norm}{}^{k,r-1})^2 + (P_{norm}{}^{k,r} - P_{norm}{}^{k,r-1})^2},$$

where $d_k$ is a total chord length after coordinates corresponding to all the power curve fitting center points are normalized, and $$d_k = \sum_{r=1}^{M_k'} d_k^r;$$

step 3-l) of fitting the power curve within the $k^{th}$ yaw error interval by using a least squares B-spline fitting algorithm, a fitting function $B_k(t)$ being defined as follows:

$$B_k(t) = \sum_{r=0}^{M_k'} N_{r,p}(t) b_k^r \quad \left( t_k^{p-1} \leq t \leq t_k^{M_k'+1} \right),$$

where $N_{r,p}(t)$ is a standard function of an $r^{th}$ segment B-spline fitting function with an order p, t is an independent variable of the least square B-spline fitting function, $b_k^r$ is an $r^{th}$ control point of the least squares B-spline fitting function; $t_k^s$ is a segment node, $s=0, 1, 2, \ldots, p-1, p, p+1, \ldots, M_k'-1, M_k', M_k'+1, \ldots, M_k'+p$, and a calculation formula is as follows:

$$t_k^s = \begin{cases} 0 & s = 0,1,2,\ldots, p-1 \\ \frac{1}{p-1} \sum_{i=i-p+1}^{i-1} \bar{t}_k^r & s = p, p+1, \ldots, M_k'-1, M_k' \\ 1 & s = M_k'+1, \ldots, M_k'+p \end{cases}$$

step 3-m) of determining all control points $\{b_k^r\}$ in the B-spline fitting function $B_k(t)$ based on a least squares optimization function as follows:

$$\min_{b_k^0, b_k^1, b_k^2, \ldots, b_k^{M_k'}} \sum_{r=0}^{M_k'} |B_k(\bar{t}_k^r) - C_k^r|$$

step 3-n) of converting the solved least squares B-spline fitting function $B_k(t)$ into a polynomial form whose independent variable is the wind speed v, as the true power curves $\{PC_k\}$ within the $k^{th}$ yaw error interval; and step 3-o) of setting an interval $k=k+1$ to be analyzed, and repeating the step 3-b) to the step 3-n) until $j > M$.

4. The method of identification and compensation of the inherent deviation of the yaw error of the wind turbine and control of a wind turbine machine yaw angle based on the true power curve according to claim 3, wherein in the step 3-c), said dividing the normalized yaw error inherent deviation analysis data set $\{\mathcal{YE}_{norm,1}{}^k\}$ into intervals comprises:

step 3-c-a) of determining a number of intervals, into which the normalized yaw error inherent deviation analysis data set $\{\mathcal{YE}_{norm,1}{}^k\}$ is divided, as M'; and step 3-c-b) of evenly dividing the data set $\{\mathcal{YE}_{norm,1}{}^k\}$ with $$\frac{1}{M'}$$

as a division interval and respectively according to the wind speed and the power, to obtain the normalized yaw error inherent deviation analysis data sets $\{\mathcal{YE}_{norm,n}{}^{k,ws,j}\}$ and $\{\mathcal{YE}_{norm,n}{}^{k,ap,j}\}$ within each wind speed interval and each power interval.

5. The method of identification and compensation of the inherent deviation of the yaw error of the wind turbine and control of a wind turbine machine yaw angle based on the true power curve according to claim 3, wherein in the step 3-d), said carrying out, by using the average distance discrimination (AVDC) outlier detection algorithm, suspected outlier detection within each interval of $\{\mathcal{YE}_{norm,n}^{k,seg,j}\}$ comprises an algorithm flow comprising:

step 3-d-a) of setting an initial outlier detection interval j=1;

step 3-d-b) of, if the number $M_{k,seg,j}$ of pieces of the data in the normalized yaw error inherent deviation analysis data set $\{\mathcal{YE}_{norm,n}^{k,seg,j}\}$ corresponding to the $j^{th}$ interval is smaller than the given minimum threshold $\delta_{M'}$, then determining that the number $m_{AVDC}^{k,seg,j}$ of the suspected outliers within the $j^{th}$ interval is 0 and the suspected outlier set $\{Outlier_{sus,AVDC}^{k,seg,j}\}$ in the normalized yaw error inherent deviation analysis data set within the $j^{th}$ interval is $\emptyset$, and skipping to step 3-d-g) to continue the algorithm flow; otherwise, proceeding to step 3-d-c);

step 3-d-c) of setting a proportion $\eta_{k,seg,j}^{AVDC}$ of suspected outliers in the normalized yaw error inherent deviation analysis data set $\{\mathcal{YE}_{norm,n}^{k,seg,j}\}$ within the $j^{th}$ interval, and calculating the number $m_{AVDC}^{k,seg,j}$ of the suspected outliers within the $j^{th}$ interval, a calculation formula being defined as:

$$M_{AVDC}^{k,seg,j} = \lceil M_{k,seg,j} \times \eta_{k,seg,j}^{AVDC} \rceil,$$

where the $\lceil \cdot \rceil$ function is an up-rounding function;

step 3-d-d) of calculating a wind speed discrimination distance $dist_{norm,n}^{k,ws,j}$ of each data point $(v_{norm,n}^{k,ws,j}, P_{norm,n}^{k,ws,j})$ in the normalized yaw error inherent deviation analysis data set $\{\mathcal{YE}_{norm,n}^{k,ws,j}\}$ within the $j^{th}$ wind speed interval, a calculation formula being as follows, $$dist_{norm,n}^{k,ws,j} = |P_{norm,n}^{k,ws,j} - \overline{P_{norm}^{k,ws,j}}| \, |n=1,2,3,\ldots,M_{k,ws,j},$$

where $\overline{P_{norm}^{k,ws,j}}$ is an average power of the normalized yaw error inherent deviation analysis data set within the $j^{th}$ wind speed interval;

step 3-d-e) of calculating a power discrimination distance $dist_{norm,n}^{k,ap,j}$ of each data point $(v_{norm,n}^{k,ap,j}, P_{norm,n}^{k,ap,j})$ in the normalized yaw error inherent deviation analysis data set $\{\mathcal{YE}_{norm,n}^{k,ap,k}\}$ within the $j^{th}$ power interval, a calculation formula being as follows:

$$dist_{norm,n}^{k,ap,j} = |v_{norm,n}^{k,ap,j} - \overline{v_{norm}^{k,ap,j}}| \, |n=1,2,3,\ldots,M_{k,ap,j},$$

where $\overline{v_{norm}^{k,ap,j}}$ is an average wind speed of the normalized yaw error inherent deviation analysis data set within the $j^{th}$ power interval;

step 3-d-f) of sorting respectively the discrimination distance data set $\{dist_{norm,n}^{k,seg,j}\}$ within the $j^{th}$ interval in descending order, and respectively selecting the first $M_{AVDC}^{k,seg,j}$ pieces of data in the sorted discrimination distance data set, to constitute the suspected outlier set $\{Outlier_{sus,AVDC}^{k,seg,j}\}$ in the normalized yaw error inherent deviation analysis data set within the $j^{th}$ interval, where n=1, 2, 3, ..., $M_{k,ap,k}$; and step 3-d-g) of setting the detection interval j=j+1, and repeating the step 3-d-b) to the step 3-d-f) until j>M'.

6. The method of identification and compensation of the inherent deviation of the yaw error of the wind turbine and control of a wind turbine machine yaw angle based on the true power curve according to claim 1, wherein in the step 4), the quantitative performance indexes $PI_k$ are as follows:

$$PI_k = \frac{0.5 N_h \left( P_j^{k,mid} + P_{j-1}^{k,mid} \right) \sum_{j=1}^{M_k} \left[ F\left(v_{j,cor}^{k,mid}\right) - F\left(v_{j-1,cor}^{k,mid}\right) \right]}{CAP}$$

where $N_h$ is a value of hours into which 1 year is converted; CAP is a rated power of the wind turbine to be analyzed; $v_{j,cor}^{k,mid}$ is a median wind speed within the $k^{th}$ yaw error interval and within a $j^{th}$ wind speed interval, $v_{j,cor}^{k,mid} = 0.5(2j-1)\Delta v$, and $v_{0,cor}^{k,mid} = 0$; $P_j^{k,mid}$ is a power value corresponding to $v_{j,cor}^{k,mid}$ on the true power curve $\{PC_k\}$ within the $k^{th}$ yaw error interval; and the $F(\cdot)$ function is a cumulative probability distribution function of Rayleigh distribution, and a formula is as follows:

$$F(v) = 1 - e^{-(\pi v^2)/(4 v_{ave}^2)}$$

where $v_{ave}$ is an annual average wind speed of the wind turbine to be analyzed.

* * * * *